(12) United States Patent
Yamazaki et al.

(10) Patent No.: US 9,438,750 B2
(45) Date of Patent: Sep. 6, 2016

(54) IMAGE READING DEVICE AND IMAGE FORMING APPARATUS

(71) Applicant: FUJI XEROX CO., LTD., Tokyo (JP)

(72) Inventors: Akira Yamazaki, Kanagawa (JP); Shiro Yamahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/818,786

(22) Filed: Aug. 5, 2015

(65) Prior Publication Data

US 2016/0212278 A1 Jul. 21, 2016

(30) Foreign Application Priority Data

Jan. 21, 2015 (JP) ................. 2015-009376

(51) Int. Cl.
| | |
|---|---|
| *G03G 15/00* | (2006.01) |
| *H04N 1/00* | (2006.01) |
| *B65H 7/06* | (2006.01) |
| *B65H 7/14* | (2006.01) |

(52) U.S. Cl.
CPC ............ *H04N 1/00037* (2013.01); *B65H 7/06* (2013.01); *B65H 7/14* (2013.01); *H04N 1/0032* (2013.01); *H04N 1/0057* (2013.01); *H04N 1/00689* (2013.01); *H04N 1/00771* (2013.01); *H04N 1/00795* (2013.01); *G03G 15/55* (2013.01); *G03G 15/70* (2013.01); *G03G 2215/00548* (2013.01); *G03G 2215/00552* (2013.01); *G03G 2221/1675* (2013.01); *H04N 2201/0094* (2013.01)

(58) Field of Classification Search
CPC .................................................... G03G 15/70
USPC ............................................................ 399/21
See application file for complete search history.

(56) References Cited

U.S. PATENT DOCUMENTS

| | | | | |
|---|---|---|---|---|
| 7,719,726 B2 * | 5/2010 | Kamei | ............... | H04N 1/00002 |
| | | | | 358/463 |
| 2013/0088762 A1 * | 4/2013 | Yamazaki | .......... | H04N 1/00543 |
| | | | | 358/498 |

FOREIGN PATENT DOCUMENTS

| | | | | | |
|---|---|---|---|---|---|
| JP | H10-26906 | A | | 1/1998 | |
| JP | H1026906 | | * | 1/1998 | ............. G03G 15/00 |
| JP | 2007-104444 | | * | 4/2007 | ............. G03G 15/00 |
| JP | 2007-104444 | A | | 4/2007 | |
| JP | 2012-080169 | A | | 4/2012 | |
| JP | 2013-080189 | | * | 5/2013 | ............. G03G 15/00 |
| JP | 2013-080189 | A | | 5/2013 | |

* cited by examiner

*Primary Examiner* — David Gray
*Assistant Examiner* — Kevin Butler
(74) *Attorney, Agent, or Firm* — Oliff PLC

(57) ABSTRACT

An image reading device includes a transport path along which a medium having an image recorded thereon is transported; a light source member that radiates light onto the medium passing a predetermined read position in the transport path; a reading member that receives light from the read position and reads the image on the medium; a detecting member that is disposed in the transport path and that detects the medium; and a notifying member that notifies a user that the medium is jammed based on a detection result of the detecting member. The light source member is turned on when the medium is jammed based on the detection result of the detecting member.

11 Claims, 25 Drawing Sheets

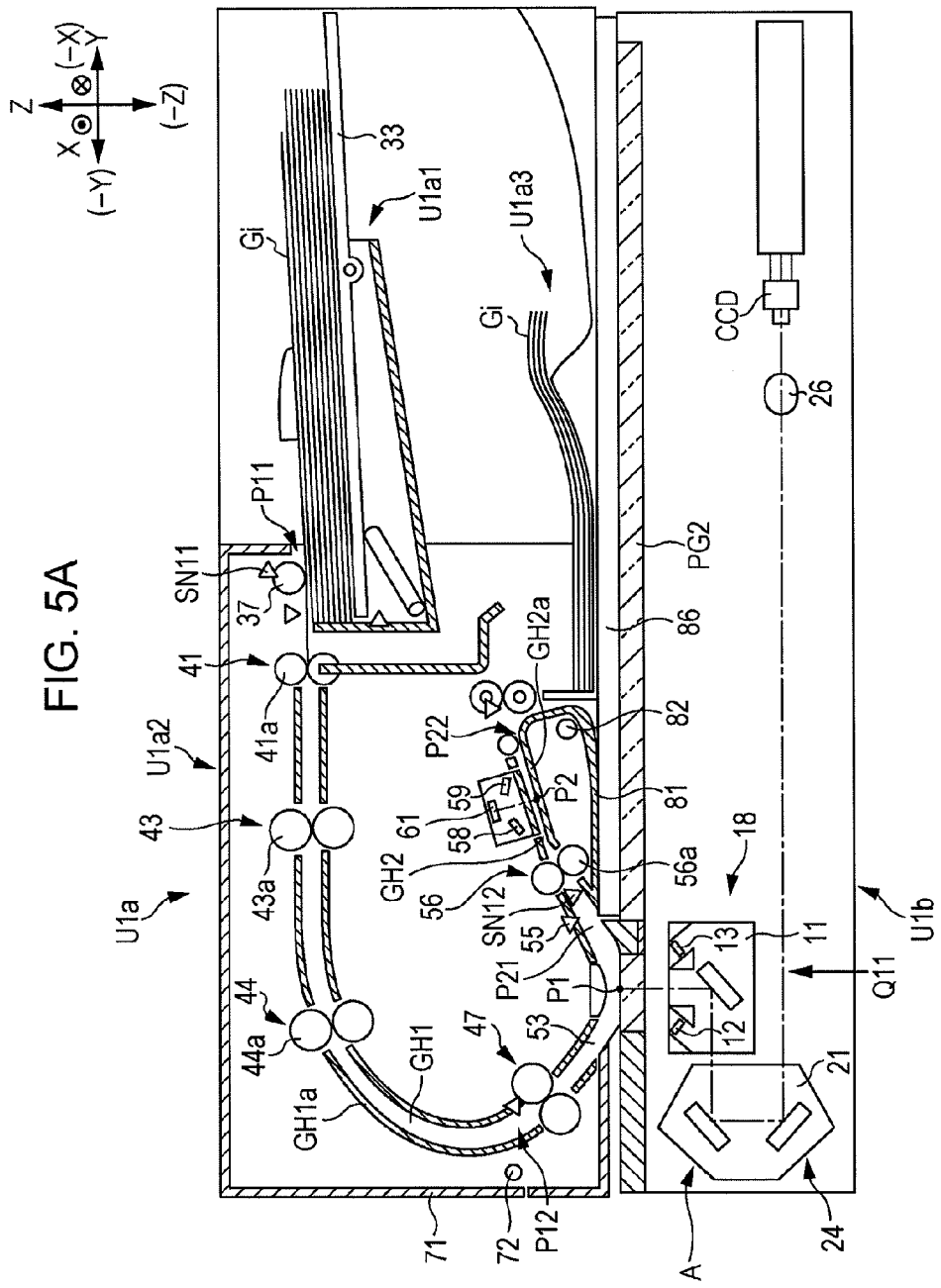

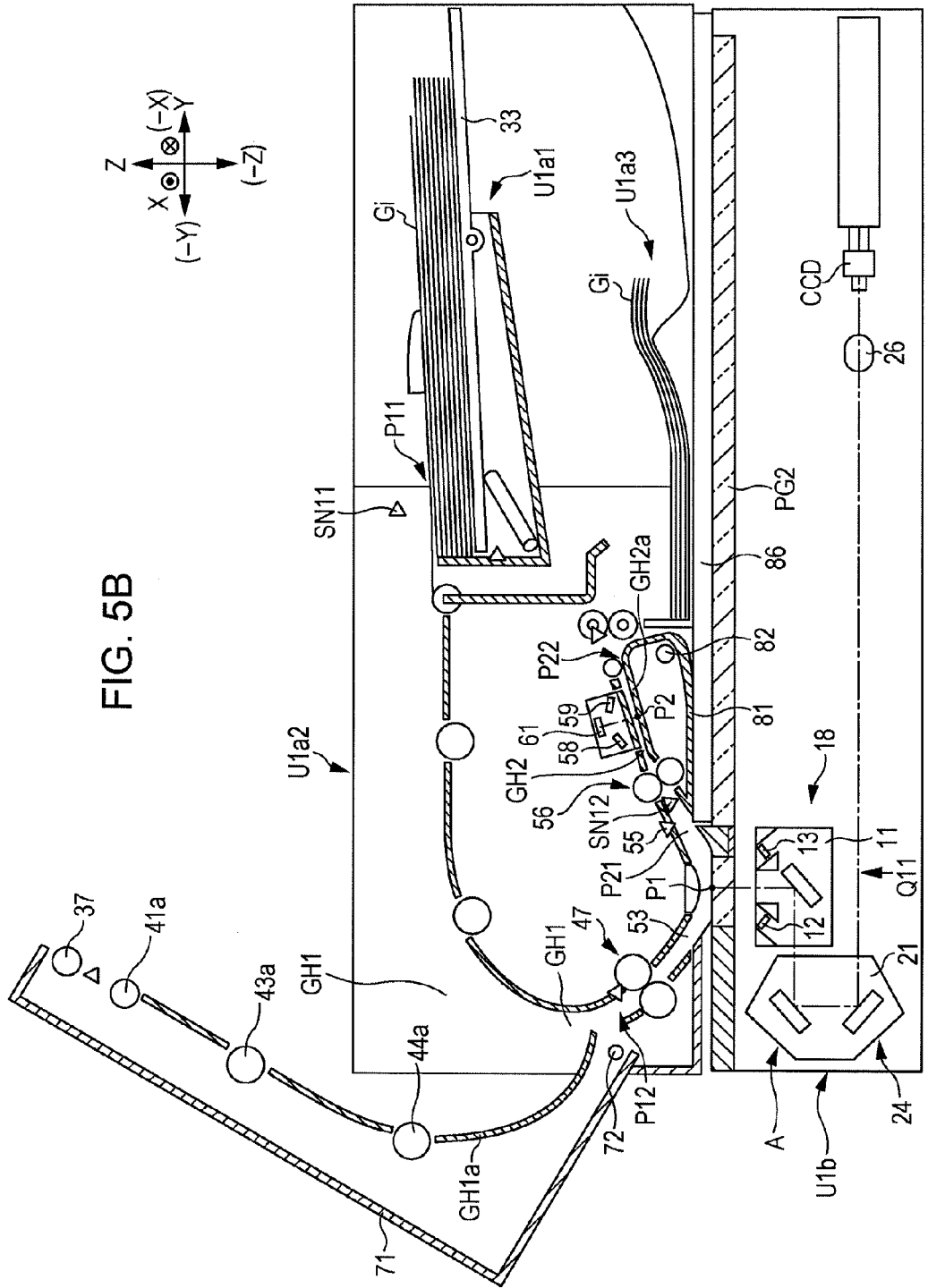

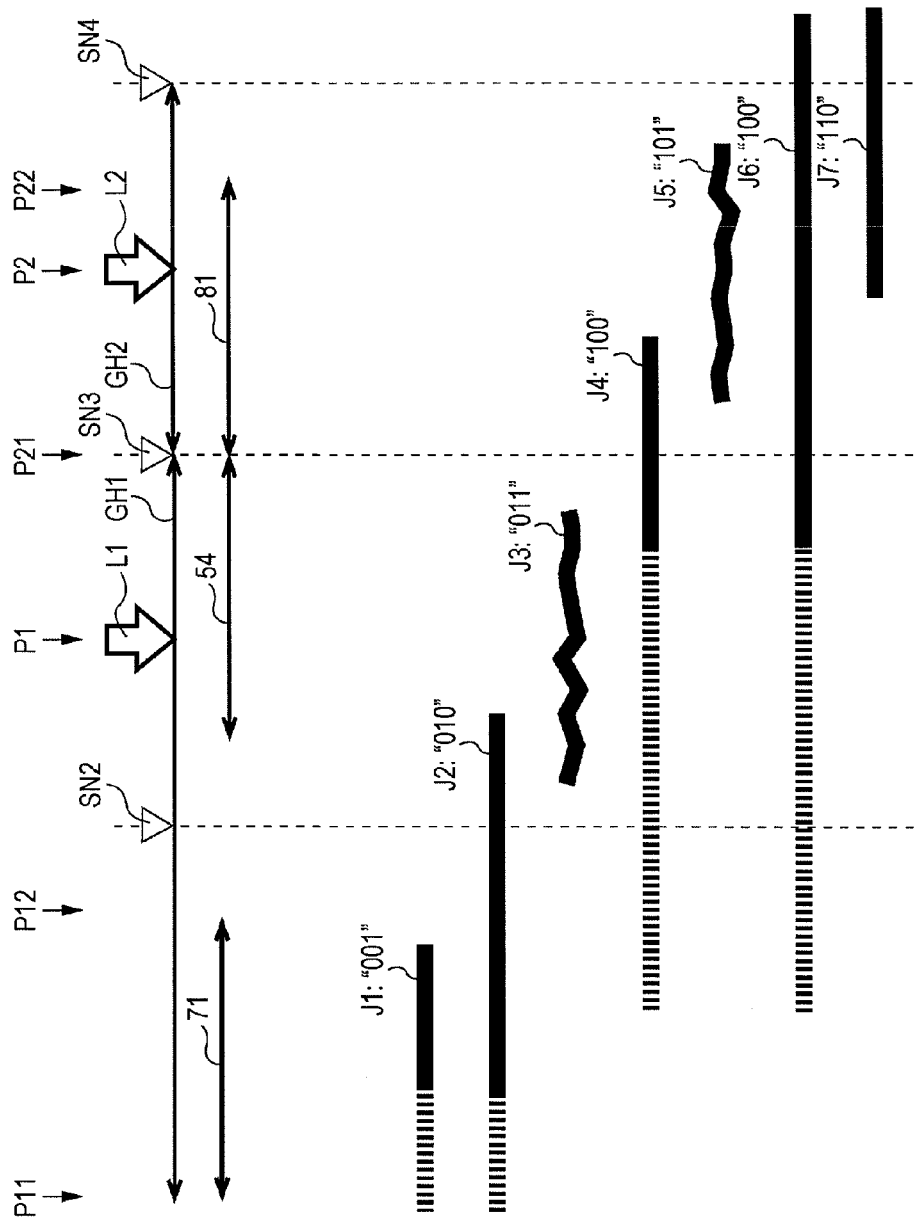

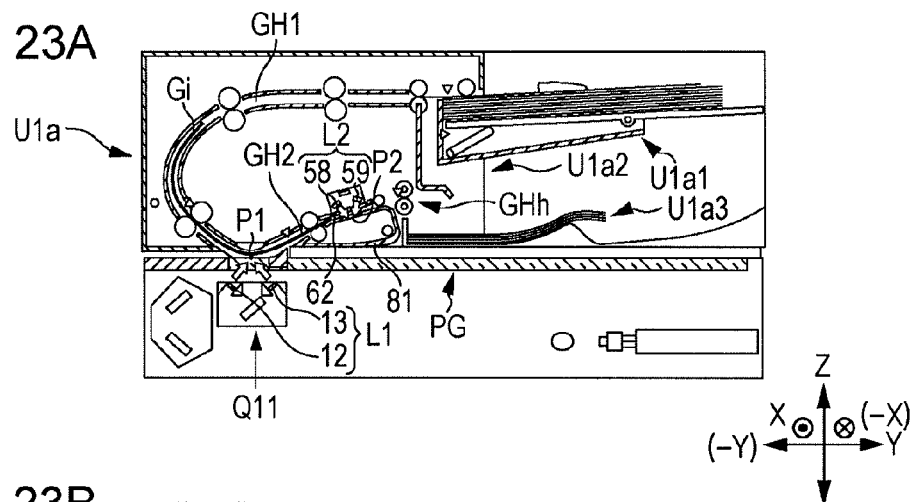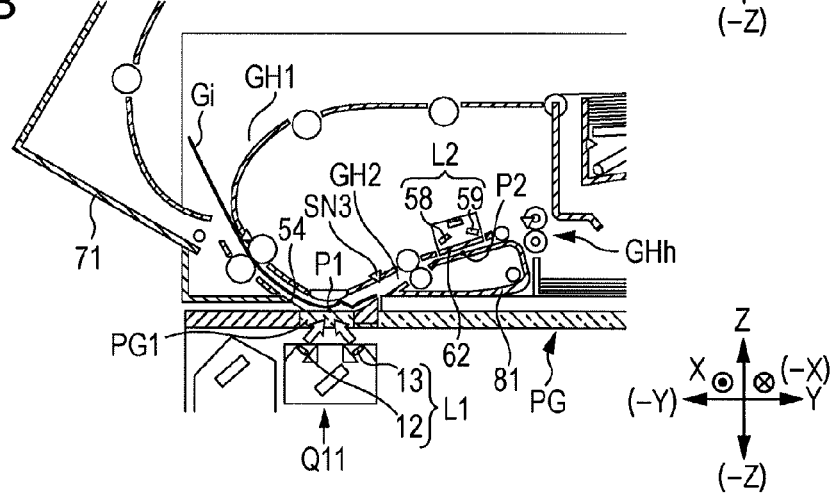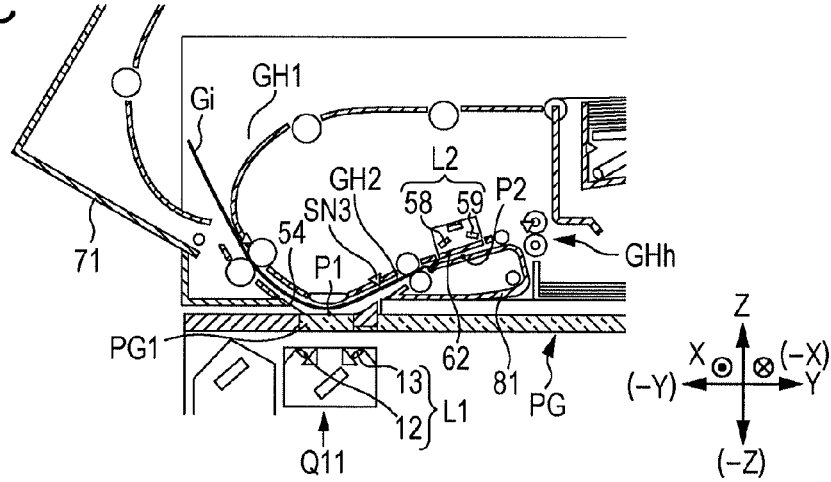

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2015-009376 filed Jan. 21, 2015.

BACKGROUND

Technical Field

The present invention relates to image reading devices and image forming apparatuses.

SUMMARY

According to an aspect of the invention, there is provided an image reading device including a transport path along which a medium having an image recorded thereon is transported; a light source member that radiates light onto the medium passing a predetermined read position in the transport path; a reading member that receives light from the read position and reads the image on the medium; a detecting member that is disposed in the transport path and that detects the medium; and a notifying member that notifies a user that the medium is jammed based on a detection result of the detecting member. The light source member is turned on when the medium is jammed based on the detection result of the detecting member.

BRIEF DESCRIPTION OF THE DRAWINGS

An exemplary embodiment of the present invention will be described in detail based on the following figures, wherein:

FIGS. 5A to 5C illustrate openable-closable members of a document transport device according to the first exemplary embodiment, FIG. 5A illustrating a state where the openable-closable members are closed, FIG. 5B illustrating a state where an upper cover has been moved to an open position, FIG. 5C illustrating a state where a lower cover has been moved to an open position;

FIG. 8 illustrates jams occurring in the first exemplary embodiment;

FIGS. 23A to 23C illustrate the operation according to the first exemplary embodiment, FIG. 23A illustrating an example where a document is jammed astride a first transport path and a second transport path, FIG. 23B illustrating a case where the document in the second transport path is removed from the state in FIG. 23A, FIG. 23C illustrating a comparison in a case where the upper cover is opened from the state in FIG. 23A.

DETAILED DESCRIPTION

Figure 1:
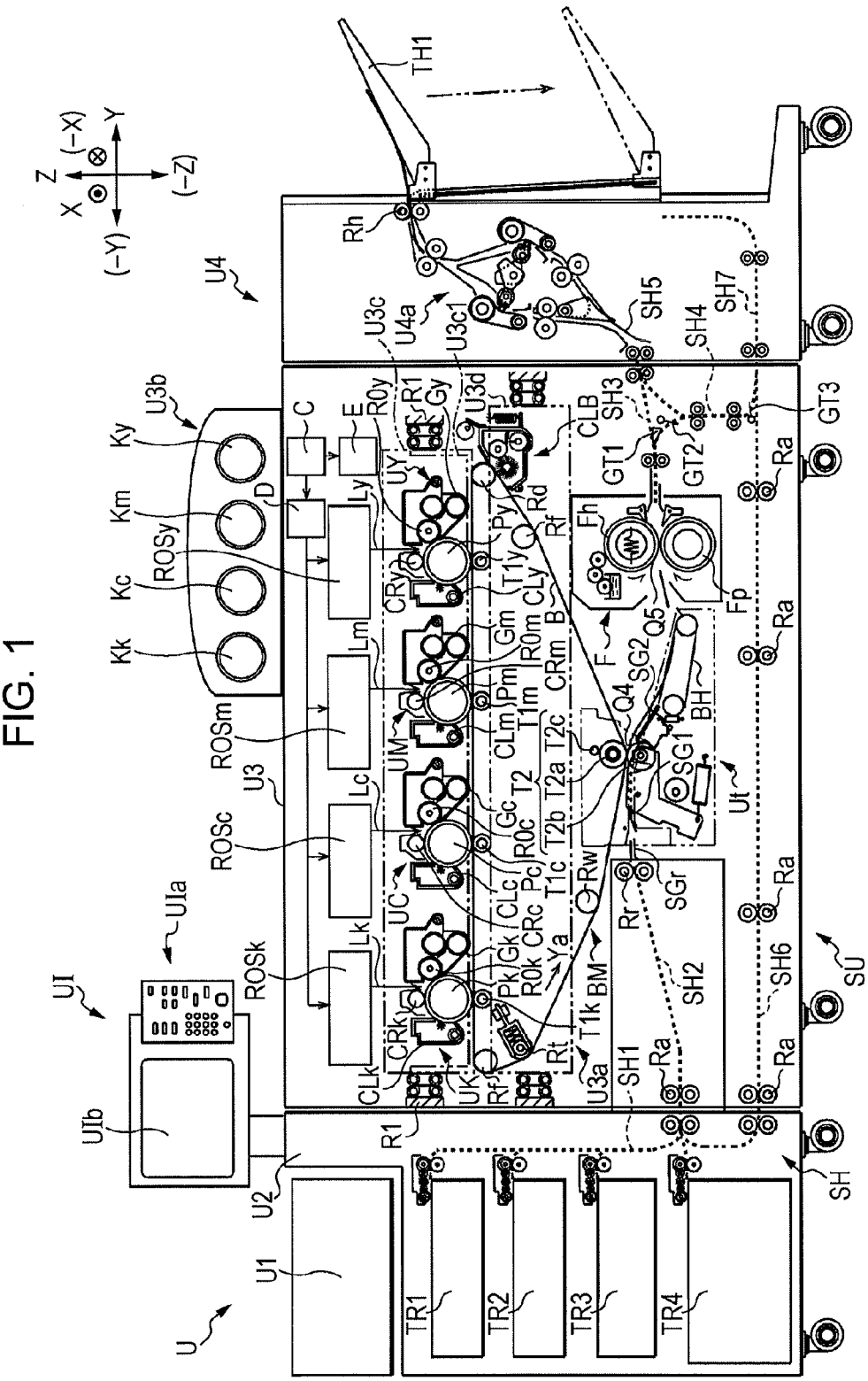
FIG. 1 is an overall view of an image forming apparatus according to a first exemplary embodiment.

Although a specific exemplary embodiment of the present invention will be described below with reference to the drawings, the present invention is not to be limited to the following exemplary embodiment.

In order to provide an easier understanding of the following description, the front-rear direction will be defined as "X-axis direction" in the drawings, the left-right direction will be defined as "Y-axis direction", and the up-down direction will be defined as "Z-axis direction". Moreover, the directions or the sides indicated by arrows X, −X, Y, −Y, Z, and −Z are defined as forward, rearward, rightward, leftward, upward, and downward directions, respectively, or as front, rear, right, left, upper, and lower sides, respectively.

Furthermore, in each of the drawings, a circle with a dot in the center indicates an arrow extending from the far side toward the near side of the plane of the drawing, and a circle with an "x" therein indicates an arrow extending from the near side toward the far side of the plane of the drawing.

In the drawings used for explaining the following description, components other than those for providing an easier understanding of the description are omitted where appropriate.

First Exemplary Embodiment

FIG. 1 is an overall view of an image forming apparatus according to a first exemplary embodiment.

Figure 2:
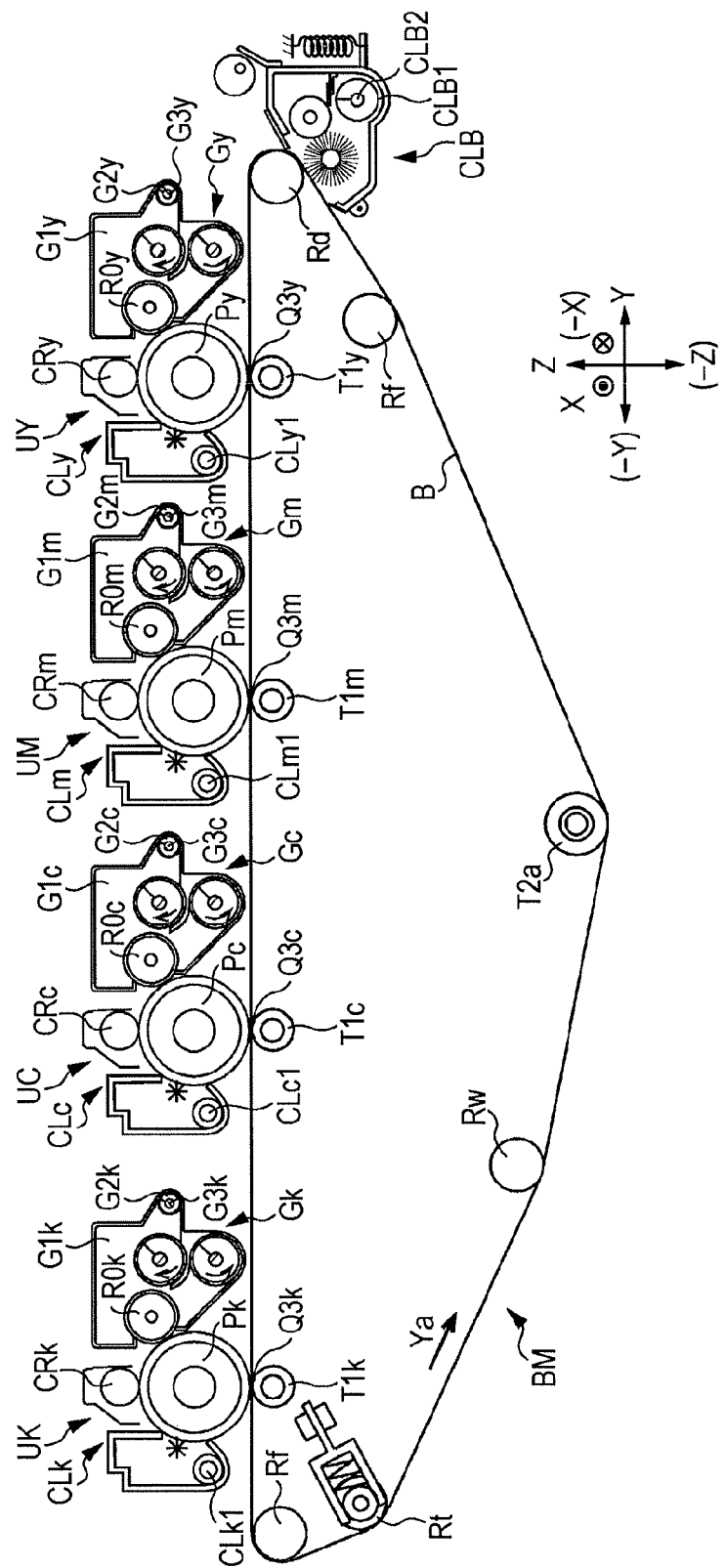
FIG. 2 is an enlarged view of a visible-image forming apparatus according to the first exemplary embodiment.

FIG. 2 is an enlarged view of a visible-image forming apparatus according to the first exemplary embodiment.

In FIG. 1, a copier U as an example of the image forming apparatus has an operable section UI, a scanner section U1 as an example of an image reading device, a feeder section U2 as an example of a medium feeding device, an image forming section U3 as an example of an image recording device, and a medium processing device U4.

Operable Section UI

The operable section UI has input buttons UIa used for starting copying and for setting the number of copy sheets. Moreover, the operable section UI has a display UIb that displays the contents input via the input buttons UIa as well as the status of the copier U.

Scanner Section U1

Figure 3:
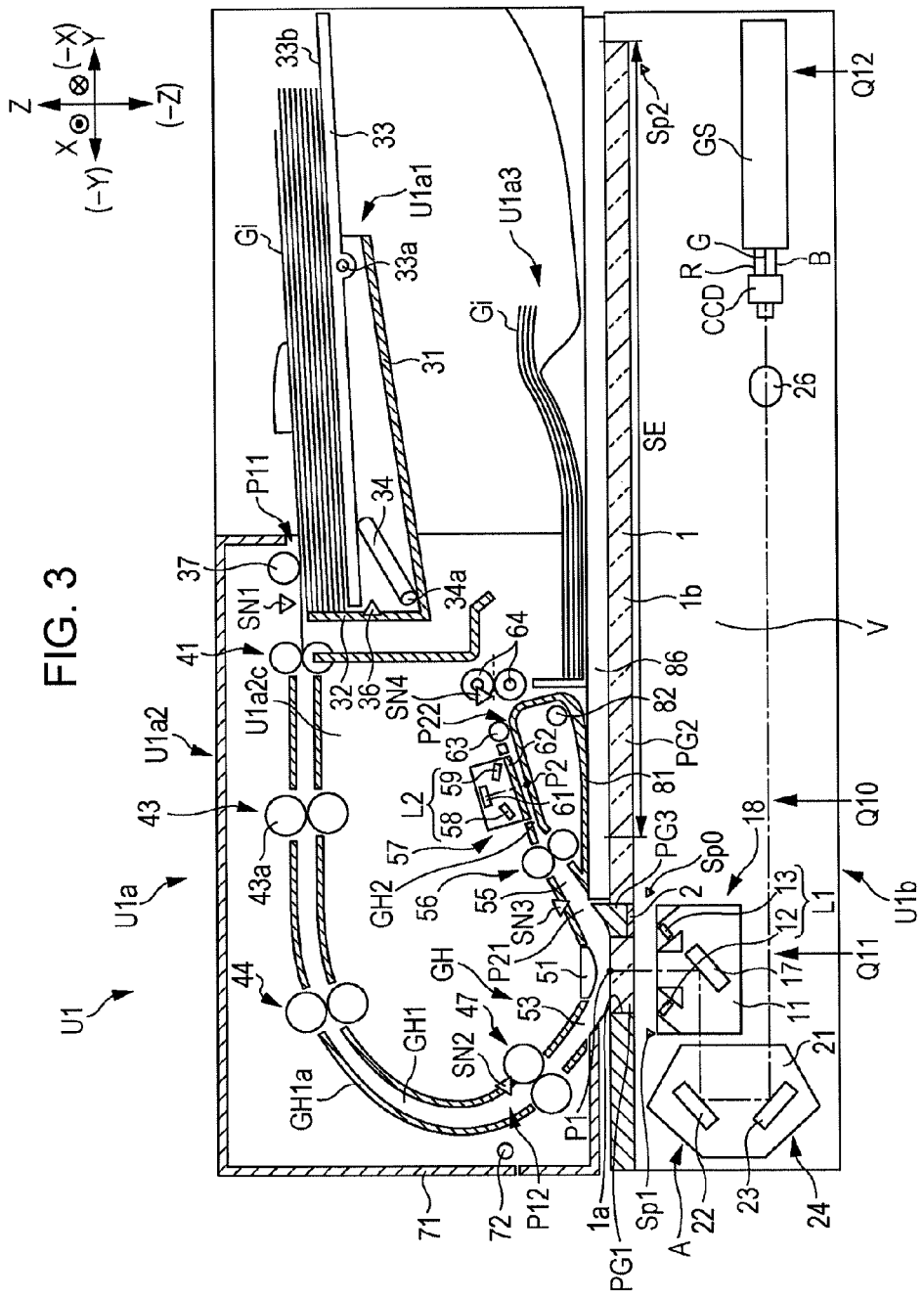
FIG. 3 is an overall view of an image reading device according to the first exemplary embodiment.

FIG. 3 is an overall view of the image reading device according to the first exemplary embodiment.

In FIGS. 1 and 3, the scanner section U1 has a scanner body U1b as an example of an image-reading-device body, which has a transparent document base PG at an upper end thereof. A document transport device U1a is disposed at the upper surface of the scanner body U1b. The document transport device U1a is supported in an openable-closable manner such that it is capable of uncovering and covering the document base PG.

The document transport device U1a has a document feed tray U1a1 as an example of a document load section that accommodates a stack of multiple documents Gi to be copied. A document transport section U1a2 is provided to the left of the document feed tray U1a1. The document transport section U1a2 transports the documents Gi on the document feed tray U1a1 onto the document base PG. A document output tray U1a3 as an example of a document output section is disposed below the document feed tray U1a1. Each document Gi that has traveled over the document base PG is output onto the document output tray U1a3 from the document transport section U1a2.

In FIG. 3, a read window PG1 as an example of a first read surface over which a document travels is disposed at the left end of the document base PG. The read window PG1 is formed in correspondence with a predetermined first-face read position P1 on a transport path of the document transport device U1a. Each document Gi transported by the document transport device U1a travels over the read window PG1. Platen glass PG2 that supports a document Gi set by a user is disposed to the right of the read window PG1. A document guide PG3 as an example of a guide is supported between the read window PG1 and the platen glass PG2. The document guide PG3 guides each document Gi that has traveled over the read window PG1 into the document transport device U1a.

An exposure optical system A is supported inside the scanner body U1b. The exposure optical system A has a first light source L1. The first light source L1 radiates light onto each document Gi traveling over the read window PG1 or onto the document Gi set on the platen glass PG2. Reflected light from the document Gi is converted into red (R), green (G), and blue (B) electric signals by a solid-state imaging element CCD as an example of a first reading member via multiple optical members of the exposure optical system A and is input to an image processor GS.

The image processor GS converts the R, G, and B electric signals input from the solid-state imaging element CCD into black (K), yellow (Y), magenta (M), and cyan (C) image information, temporarily stores the image information, and outputs the image information as latent-image-forming, image information to a latent-image-forming-device drive circuit D of the image forming section U3 at a predetermined timing.

If a document image is a monochrome image, black (K) image information alone is input to the latent-image-forming-device drive circuit D.

The document base PG, the exposure optical system A, the solid-state imaging element CCD, and the image processor GS constitute the scanner body U1b according to the first exemplary embodiment.

Feeder Section U2

In FIG. 1, the feeder section U2 has feed trays TR1, TR2, TR3, and TR4 as an example of medium containers. Furthermore, the feeder section U2 has, for example, a medium feed path SH1 that fetches a recording sheet S as an example of a medium accommodated in each of the feed trays TR1 to TR4 and transports the recording sheet S to the image forming section U3.

Image Forming Section U3 and Medium Processing Device U4

Referring to FIGS. 1 and 2, in the image forming section U3, the latent-image-forming-device drive circuit D outputs a drive signal to latent-image forming devices ROSy to ROSk of the respective colors based on, for example, the image information input from the scanner section U1. For example, image bearing members Py to Pk and charging units CRy to CRk are disposed below the latent-image forming devices ROSy to ROSk. Electrostatic latent images are formed on the surfaces of the image bearing members Py to Pk by the latent-image forming devices ROSy to ROSk and are developed into toner images as an example of visible images by developing devices Gy to Gk. The developing devices Gy to Gk are supplied with developers from toner cartridges Ky to Kk attached to a developer supplying device U3b. The toner images on the surfaces of the image bearing members Py to Pk are transferred onto an intermediate transfer belt B as an example of an intermediate transfer body in first-transfer regions Q3y to Q3k by first-transfer units T1y to T1k. After the first-transfer process, the image bearing members Py to Pk are cleaned by cleaners CLy to CLk.

An intermediate transfer device BM is supported below the latent-image forming devices ROSy to ROSk. The intermediate transfer device BM has the intermediate transfer belt B as an example of an intermediate transfer member and support members Rd+Rt+Rw+Rf+T2a for the intermediate transfer member. The intermediate transfer belt B is supported in a rotatable manner in a direction indicated by an arrow Ya. A second-transfer unit Ut is disposed below an opposing member T2a. The second-transfer unit Ut has a second-transfer member T2b. The second-transfer member T2b comes into contact with the intermediate transfer belt B so as to form a second-transfer region Q4. The opposing member T2a is in contact with an electric feed member T2c. The electric feed member T2c is supplied with second-transfer voltage with the same polarity as the charge polarity of toners.

A transport path SH2 along which the recording sheet S from the feeder section U2 is transported is disposed below the intermediate transfer device BM. In the transport path SH2, the recording sheet S is transported by a transport roller Ra as an example of a transport member to a registration roller Rr as an example of a transport-timing adjusting member. The registration roller Rr transports the recording sheet S to the second-transfer region Q4 in accordance with the timing at which the toner images on the intermediate transfer belt B are transported to the second-transfer region Q4.

When the toner images on the intermediate transfer belt B pass through the second-transfer region Q4, the toner images are transferred onto the recording sheet S by a second-transfer unit T2. After the second-transfer process, the intermediate transfer belt B is cleaned by an intermediate-transfer-body cleaner CLB. The recording sheet S having the toner images transferred thereon is transported to a medium transport belt BH as an example of a transport member and is then transported to a fixing device F. In the fixing device F, the recording sheet S having the toner images transferred thereon travels through a fixing region Q5 where a heating member Fh and a pressing member Fp come into contact with each other, so that the toner images become fixed onto the recording sheet S.

If the recording sheet S having the toner images fixed thereon is to be output, the recording sheet S is transported from a transport path SH3 to a transport path SH5 in the medium processing device U4. The medium processing device U4 has a curl correcting member U4a that corrects a curl in the recording sheet S, and also has an output member Rh by which the recording sheet S is output onto an output tray TH1. If an image is to be recorded onto the second face of the recording sheet S, the recording sheet S having the toner images fixed thereon is transported from the transport path SH3 to an inversion path SH4 and a circulation path SH6 so as to be turned over, and then travels along the medium feed path SH1 so as to be transported again to the second-transfer region Q4. The switching between the transport destinations is performed by switching members GT1 to GT3. A sheet transport path SH is constituted by components denoted by the reference characters SH1 to SH7. Furthermore, a sheet transport device SU according to the first exemplary embodiment is constituted by components denoted by the reference characters SH, Ra, Rr, Rh, SGr, SG1, SG2, BH, and GT1 to GT3.

Scanner Body U1b

Figure 4:
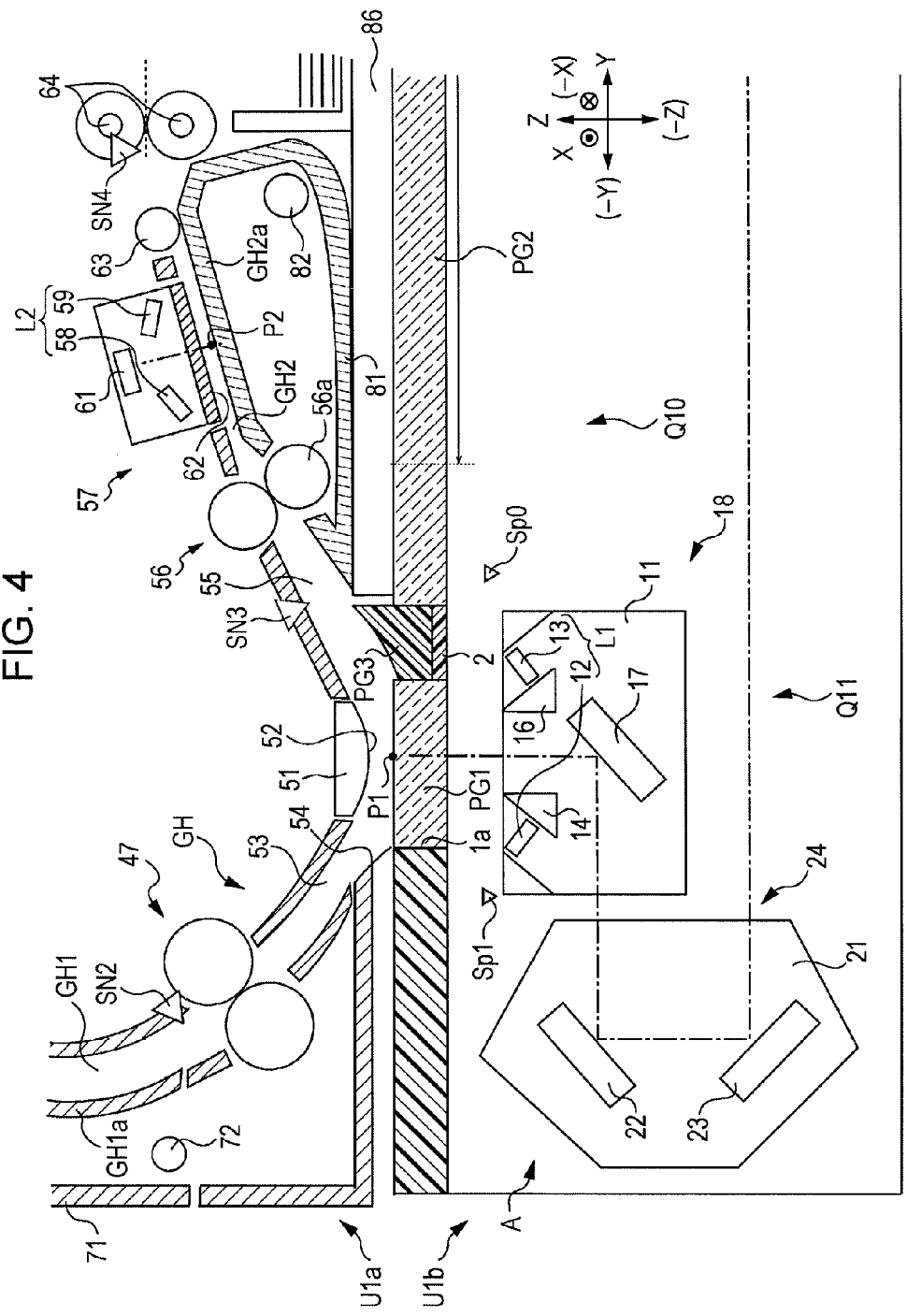
FIG. 4 illustrates a relevant part of an image-reading-device body according to the first exemplary embodiment.

FIG. 4 illustrates a relevant part of the image-reading-device body according to the first exemplary embodiment.

Referring to FIGS. 3 and 4, a glass support opening 1 as an example of an opening is formed in the upper surface of the scanner body U1b. The glass support opening 1 according to the first exemplary embodiment has a rectangular shape. A guide support 2 as an example of a partition is provided to the left of the glass support opening 1. The guide support 2 has a shape of a plate extending in the front-rear direction.

Thus, the guide support 2 partitions the glass support opening 1 into a rectangular automatic read opening 1a located at the left side and extending in the front-rear direction and a rectangular manual read opening 1b located at the right side and larger than a document of a predetermined maximum readable size. The automatic read opening 1a supports the read window PG1, whereas the manual read opening 1b supports the platen glass PG2. The read window PG1 and the platen glass PG2 according to the first exemplary embodiment are both formed of transparent glass.

Furthermore, the guide support 2 supports the document guide PG3. The document guide PG3 according to the first exemplary embodiment extends in the front-rear direction and has an inclined shape such that the document guide PG3 at the left edge thereof is set to be lower in height than the upper surface of the read window PG1 and increases in height toward the right side.

Referring to FIGS. 3 and 4, a full-rate carriage 11 as an example of a first moving member is disposed in a space V below the document base PG. The full-rate carriage 11 is supported by the scanner body U1b in a movable manner in the left-right direction along the lower surface of the document base PG.

In the first exemplary embodiment, the first-face read position P1 as an example of a first read position is set in correspondence with the center of the read window PG1 in the left-right direction. Furthermore, a manual read region SE is preset in the platen glass PG2. The manual read region SE is set in accordance with a document Gi as an example of a maximum-size medium placeable on the platen glass PG2. Thus, the full-rate carriage 11 according to the first exemplary embodiment is movable to a left-end position Q11 in correspondence with the first-face read position P1. Furthermore, the full-rate carriage 11 according to the first exemplary embodiment is movable to a right-end position Q12 in correspondence with the right end of the manual read region SE. With regard to the full-rate carriage 11 according to the first exemplary embodiment, a home position Q10 as an example of an initial position is set in correspondence with the left end of the manual read region SE. Specifically, the full-rate carriage 11 according to the first exemplary embodiment is supported in a movable manner between the home position Q10 and the left-end position Q11 and between the home position Q10 and the right-end position Q12.

The full-rate carriage 11 supports the first light source L1 as an example of a first light source member. The first light source L1 radiates light onto the documents Gi on the read window PG1 and the platen glass PG2. In the full-rate carriage 11 shown in FIG. 3 that has moved to the left-end position Q11, the first light source L1 according to the first exemplary embodiment has a pair of left and right light emitters 12 and 13. The left light emitter 12 as an example of an upstream light emitter radiates light toward the first-face read position P1 from the lower left side. The right light emitter 13 as an example of a downstream light emitter radiates light toward the first-face read position P1 from the lower right side. Thus, when a document Gi is transported, the left light emitter 12 radiates light toward the first-face read position P1 from the upstream side in the document transport direction, and the right light emitter 13 radiates light toward the first-face read position P1 from the downstream side in the document transport direction. In the left light emitter 12 according to the first exemplary embodiment, multiple white light emitting diodes (LEDs) as an example of light emitting elements are arranged in a first scanning direction. Moreover, in the left light emitter 12, the white LEDs are individually switchable between on and off states. The right light emitter 13 according to the first exemplary embodiment has a configuration similar to the left light emitter 12. Therefore, in the first exemplary embodiment, the left and right light emitters 12 and 13 are independently switchable between on and off states.

Screens 14 and 16 are formed near the light emitters 12 and 13. The screens 14 and 16 block off light emitted from the light emitters 12 and 13 but traveling in directions deviated from the first-face read position P1. A first reflector plate 17 is supported between and below the light emitters 12 and 13. The first reflector plate 17 reflects leftward the light reflected from the document Gi at the first-face read position P1. The full-rate carriage 11, the light emitters 12 and 13, the screens 14 and 16, and the first reflector plate 17 constitute a light source unit 18 according to the first exemplary embodiment.

A half-rate carriage 21 as an example of a second moving member is disposed to the left of the light source unit 18. The half-rate carriage 21 is supported in a movable manner in the left-right direction along the lower surface of the document base PG. The half-rate carriage 21 moves in conjunction with the full-rate carriage 11 and is configured to move at half the rate of the full-rate carriage 11. The half-rate carriage 21 supports a second reflector plate 22. The second reflector plate 22 reflects downward the light reflected from the first reflector plate 17. A third reflector plate 23 is supported below the second reflector plate 22. The third reflector plate 23 reflects rightward the light reflected by the second reflector plate 22. The half-rate carriage 21, the second reflector plate 22, and the third reflector plate 23 constitute a reflector unit 24 according to the first exemplary embodiment.

In FIG. 3, a focusing member 26 is disposed to the right of the reflector unit 24. The focusing member 26 receives the light reflected from the third reflector plate 23. The solid-state imaging element CCD as an example of a first reading member is disposed to the right of the focusing member 26. The solid-state imaging element CCD is electrically connected to the image processor GS.

The light emitters 12 and 13, the first reflector plate 17, the second reflector plate 22, the third reflector plate 23, and the focusing member 26 constitute the exposure optical system A according to the first exemplary embodiment.

A first unit sensor Sp0 as an example of a unit position detecting member is disposed at an upper left portion of the space V. The first unit sensor Sp0 detects the light source unit 18 that has moved to the home position Q10. Moreover, a second unit sensor Sp1 is disposed to the left of the first unit sensor Sp0. The second unit sensor Sp1 detects the light source unit 18 that has moved to the left-end position Q11. Furthermore, a third unit sensor Sp2 is disposed at an upper right portion of the space V. The third unit sensor Sp2 detects the light source unit 18 that has moved to the right-end position Q12.

Document Transport Device U1a

The document transport device U1a is supported in an openable-closable manner about a rotation axis provided at the rear of the scanner body U1b and extending in the left-right direction. Specifically, the document transport device U1a is supported in a movable manner between a working position at which the document base PG is uncovered and a readable position shown in FIG. 3 at which the document base PG is covered.

Referring to FIG. 3, the document feed tray U1a1 of the document transport device U1a has a base 31 extending in the left-right direction and a left wall 32 extending upward from the left edge of the base 31. The base 31 supports an ascendable-descendible plate 33 as an example of an ascendable-descendible member. The ascendable-descendible plate 33 is supported in a rotatable manner about a rotation axis 33a extending in the front-rear direction. The upper surface of the ascendable-descendible plate 33 is provided with a document load surface 33b.

The left edge of the base 31 supports an ascending-descending rod 34 as an example of an ascending-descending drive member. The ascending-descending rod 34 is supported by a rotation shaft 34a extending in the front-rear direction. The ascending-descending rod 34 extends in the radial direction from the rotation shaft 34a and comes into contact with a left area of the lower surface of the ascendable-descendible plate 33, which descends under its own weight. The rotation shaft 34a is capable of receiving a driving force from a drive source (not shown). Thus, when the rotation shaft 34a receives a driving force and the ascending-descending rod 34 rotates, the left edge of the ascendable-descendible plate 33 ascends or descends.

A document amount sensor 36 as an example of a document-amount detecting member is disposed at the front side of the ascendable-descendible plate 33. The document amount sensor 36 detects the presence or absence of the ascendable-descendible plate 33 or the documents Gi so as to detect the amount of documents Gi. Specifically, when the ascendable-descendible plate 33 ascends, if there is a small amount of documents Gi, the ascendable-descendible plate 33 moves upward to a position higher than the document amount sensor 36. In this case, the ascendable-descendible plate 33 is not detected. On the other hand, if there is a large amount of documents Gi, the ascendable-descendible plate 33 is positioned lower in height than the document amount sensor 36, so that the document amount sensor 36 detects the ascendable-descendible plate 33 or the documents Gi.

Thus, based on the detection result obtained by the document amount sensor 36 when the ascendable-descendible plate 33 ascends, it is detectable whether the amount of documents Gi is larger or smaller than a predetermined amount.

A nudging roller 37 as an example of a document fetching member is disposed above the left edge of the ascendable-descendible plate 33. A separating roller 41 as an example of a document separating member is disposed to the left of the nudging roller 37.

A document transport path GH along which each document Gi is transported is formed within the document transport section U1a2 of the document transport device U1a. The document transport path GH has a first transport path GH1, which curves in a circular-arc shape from the separating roller 41 toward the first-face read position P1, and a second transport path GH2, which extends from the first-face read position P1 to the document output tray U1a3. In the first transport path GH1, a transport roller 43 as an example of a document transport member is disposed at a position downstream of the separating roller 41 in the document transport direction. A pre-registration roller 44 as an example of a corrector is disposed downstream of the transport roller 43. A registration roller 47 as an example of a document transport-timing adjusting member is disposed downstream of the pre-registration roller 44.

In FIGS. 3 and 4, the first transport path GH1 is provided with a read guide 51 as an example of a read guide member that is located downstream of the registration roller 47 at a position facing the read window PG1 of the scanner body U1b. The read guide 51 supports a guide reflector plate 52 as an example of a reflector member. The guide reflector plate 52 has a downwardly-protruding semicircular shape. The guide reflector plate 52 according to the first exemplary embodiment has a shape of a plate extending in the front-rear direction.

Furthermore, in the first transport path GH1, an exit port 53 is provided at a position facing an upstream portion of the read guide 51 in the document transport direction. An opening 54 extending in the front-rear direction is formed downstream of the exit port 53 at a position facing the read window PG1.

The second transport path GH2 is provided with an entrance port 55 at a position facing a downstream portion of the read guide 51 in the document transport direction. In the second transport path GH2, a document transport roller 56 as an example of a document transport member is disposed downstream of the entrance port 55 in the document transport direction.

A second-face read position P2 as an example of a second read position is set downstream of the document transport roller 56. The second-face read position P2 is preset in the second transport path GH2. In the second transport path GH2, a reading unit 57 is disposed in correspondence with the second-face read position P2. The reading unit 57 is disposed at the second-face side of the document Gi.

The reading unit 57 has a second light source L2 as an example of a second light source member. The second light source L2 radiates light toward the second-face read position P2. The second light source L2 according to the first exemplary embodiment has a pair of light emitters 58 and 59 arranged in the transport direction relative to the second-face read position P2. Specifically, the second light source L2 according to the first exemplary embodiment has an upstream light emitter 58 as an example of an upstream light emitter and a downstream light emitter 59 as an example of a downstream light emitter. Other than the fact that the light emitters 58 and 59 radiate light toward the second-face read position P2 from their set positions, the light emitters 58 and 59 according to the first exemplary embodiment are similar in configuration to the light emitters 12 and 13. Therefore, detailed descriptions of the light emitters 58 and 59 will be omitted.

A read sensor 61 as an example of a second reading member is disposed between the upstream light emitter 58 and the downstream light emitter 59. The read sensor 61 receives light from the second-face read position P2 and reads an image on the second face of the document Gi. A read surface 62 as an example of a cover member is supported below the read sensor 61. The read surface 62 is composed of a light transmittable material. The read surface 62 covers the read sensor 61. The read sensor 61 according to the first exemplary embodiment is formed of a contact image sensor (CIS). The second light source L2, the read sensor 61, and the read surface 62 constitute the reading unit 57. A reading roller 63 as an example of a reading assisting member is disposed downstream of the reading unit 57. An output roller 64 that outputs the document Gi to the document output tray U1a3 is disposed downstream of the reading roller 63.

Sensors in Transport Path

In the document transport path GH, sensors SN1, SN2, SN3, and SN4 are disposed as an example of medium detecting members.

A document sensor SN1 as an example of a first medium detecting member is disposed downstream of the nudging roller 37. The document sensor SN1 detects whether or not there is a document Gi on the document feed tray U1a1.

A registration sensor SN2 as an example of a second medium detecting member is disposed upstream of the registration roller 47. Furthermore; an entrance sensor SN3 as an example of a third medium detecting member is disposed at the entrance port 55. Moreover, an output sensor SN4 as an example of a fourth medium detecting member is disposed near the output roller 64. The sensors SN1 to SN4 detect the presence or absence of a document Gi.

Upper Cover

Figure 5C:
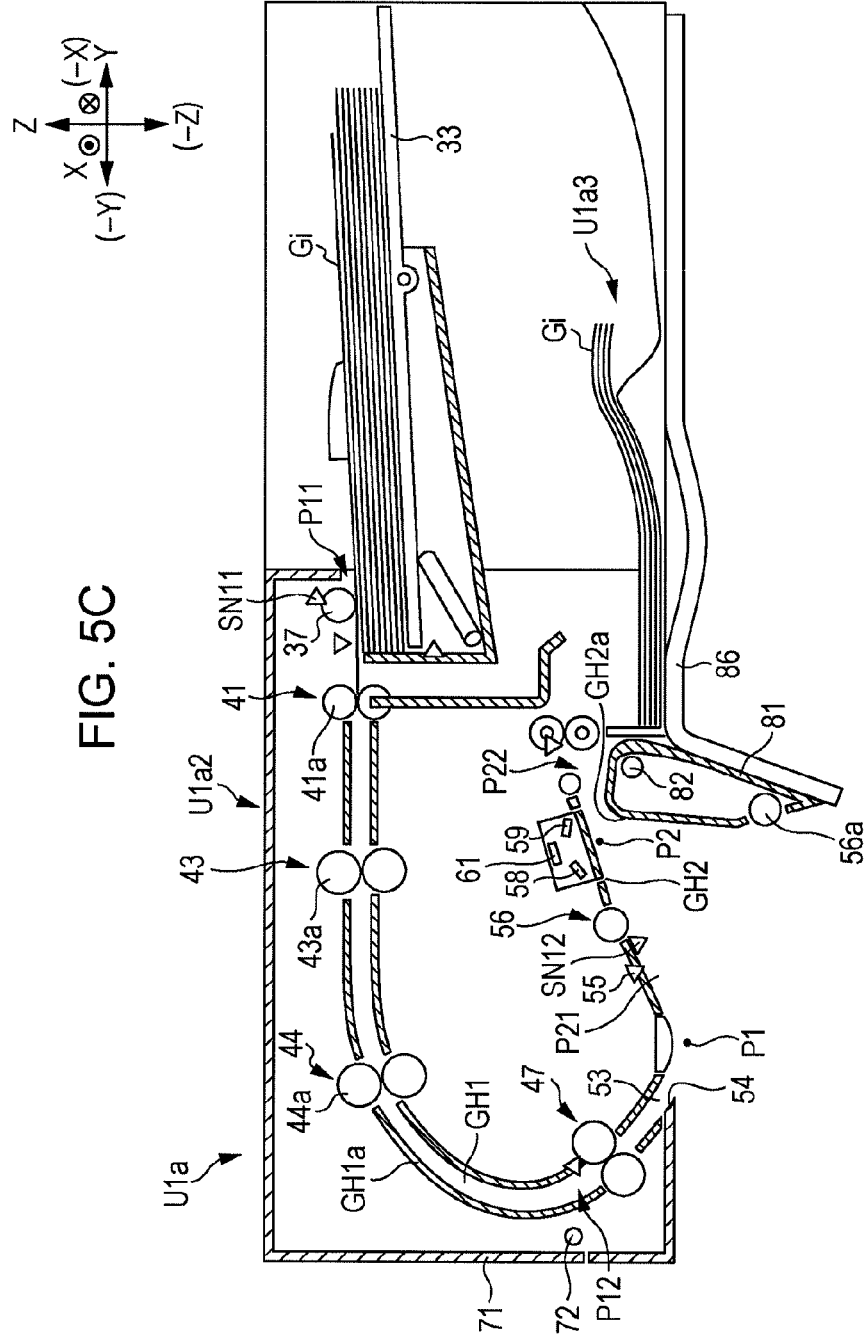

FIGS. 5A to 5C illustrate openable-closable members of the document transport device U1a. Specifically, FIG. 5A illustrates a state where the openable-closable members are closed, FIG. 5B illustrates a state where an upper cover has been moved to an open position, and FIG. 5C illustrates a state where a lower cover has been moved to an open position.

In FIGS. 5A to 5C, the document transport section U1a2 has an upper cover 71 as an example of a first openable-closable member. The upper cover 71 is disposed in correspondence with the first transport path GH1. The upper cover 71 is supported in an openable-closable manner about a rotation axis 72 provided at the upper left side of the registration roller 47 and extending in the front-rear direction. In other words, the upper cover 71 is supported in an openable-closable manner between a normal position shown in FIG. 5A as an example of a closed position and an open position shown in FIG. 5B.

The upper cover 71 according to the first exemplary embodiment supports the nudging roller 37. Moreover, with regard to the separating roller 41, a roller 41a included in a pair of opposing rollers constituting the separating roller 41 and disposed at the outer side of the document transport section U1a2 is supported by the upper cover 71. Likewise, with regard to the transport roller 43 and the pre-registration roller 44, outer rollers 43a and 44a included in respective pairs of opposing rollers are supported by the upper cover 71. Furthermore, with regard to transport walls that form the first transport path GH1, an outer transport wall GH1a of the document transport section U1a2 is supported by the upper cover 71. Thus, in the first exemplary embodiment, when the upper cover 71 moves to the open position, the first transport path GH1 becomes uncovered from an upstream end P11 to an upstream portion P12 of the registration roller 47. The document transport section U1a2 supports an upper sensor SN11 as an example of a first open-close detecting member. The upper sensor SN11 detects the presence or absence of the upper cover 71.

Lower Cover

In FIGS. 5A to 5C, the document transport section U1a2 has a lower cover 81 as an example of a second openable-closable member. The lower cover 81 is provided in correspondence with the second transport path GH2. The lower cover 81 is supported in an openable-closable manner about a rotation axis 82 provided below the reading roller 63 and extending in the front-rear direction. In other words, the lower cover 81 is supported in an openable-closable manner between a normal position shown in FIG. 5A as an example of a closed position and an open position shown in FIG. 5O. The configuration related to the opening and closing of the lower cover 81 according to the first exemplary embodiment may be achieved by applying the configuration discussed in Japanese Unexamined Patent Application Publication No. 2013-80189. Therefore, a detailed description of the configuration related to the opening and closing of the lower cover 81 will be omitted.

The lower cover 81 according to the first exemplary embodiment supports a roller 56a included in a pair of opposing rollers constituting the document transport roller 56 and disposed at the outer side of the document transport section U1a2. Furthermore, with regard to transport walls that form the second transport path GH2, an outer transport wall GH2a of the document transport section U1a2 is supported by the lower cover 81. The outer surface of the lower cover 81 and the lower surface of the document output tray U1a3 support a white-colored plate 86 in accordance with the platen glass PG2 of the scanner body U1b. In the first exemplary embodiment, when the lower cover 81 moves to the open position, the second transport path GH2 becomes uncovered from a position P21 of the entrance port 55 to a downstream portion P22 of the output roller 64. The document transport section U1a2 supports a lower sensor SN12 as an example of a second open-close detecting member. The lower sensor SN12 detects the presence or absence of the lower cover 81.

Functions of Scanner Body U1b and Document Transport Device U1a

When the scanner body U1b having the above-described configuration is to read an image from a document Gi placed on the platen glass PG2, the light source unit 18 scans the document Gi from the left edge to the right edge thereof. Specifically, the light source unit 18 radiates light toward the document Gi and receives reflected light from the document Gi while moving from the home position Q10 toward the right-end position Q12. The reflector unit 24 moves in conjunction with the light source unit 18 and reflects the light from the light source unit 18 toward the focusing member 26. The focusing member 26 focuses the light from the reflector unit 24. The solid-state imaging element CCD receives the light passing through the focusing member 26 and reads the image of the document Gi.

When an image is to be read from a document Gi transported by the document transport device U1a, the light source unit 18 moves from the home position Q10 to the left-end position Q11. In this case, as shown in FIG. 3, in the document transport device U1a, the ascendable-descendible plate 33 ascends until the upper surface of the documents Gi comes into contact with the nudging roller 37. Then, the nudging roller 37 rotates so as to feed the documents Gi. The documents Gi fed by the nudging roller 37 are separated one-by-one by the separating roller 41. Each separated document Gi is transported to the pre-registration roller 44 by the transport roller 43. The document Gi transported by the transport roller 43 is transported downstream by the pre-registration roller 44.

The document Gi transported by the pre-registration roller 44 is transported to the first-face read position P1 by the registration roller 47 at a predetermined timing. The document Gi passing the first-face read position P1 is irradiated with light from the light source unit 18 of the scanner body U1b via the read window PG1. Reflected light from the document Gi is received by the solid-state imaging element CCD via the light source unit 18, the reflector unit 24, and the focusing member 26, whereby the image of the document Gi is read. The document Gi that has passed the first-face read position P1 is transported by the document transport roller 56 to the second-face read position P2. If both faces of the document Gi are to be read, the read sensor 61 reads an image of the second face, which is opposite the first face read by the solid-state imaging element CCD, of the document Gi passing the second-face read position P2.

In the first exemplary embodiment, when an image is to be read by the read sensor 61, the document Gi is retained by the reading roller 63 so that the gap between the document Gi and the read sensor 61 may be readily made stable. The document Gi that has passed the second-face read position P2 is output to the document output tray U1a3 by the output roller 64.

Furthermore, in the document transport path GH, the presence or absence of the document Gi is detected by the sensors SN2 to SN4. Thus, based on detection results of the sensors SN2 to SN4, it is detected whether the document Gi is jammed. If a jam is detected, for example, the upper cover 71 or the lower cover 81 is opened so that the jammed document Gi becomes removable from the document transport path GH. The upper cover 71 and the lower cover 81 may also be opened at the time of, for example, maintenance or inspection of the document transport section U1a2.

Controller According to First Exemplary Embodiment

Figure 6:
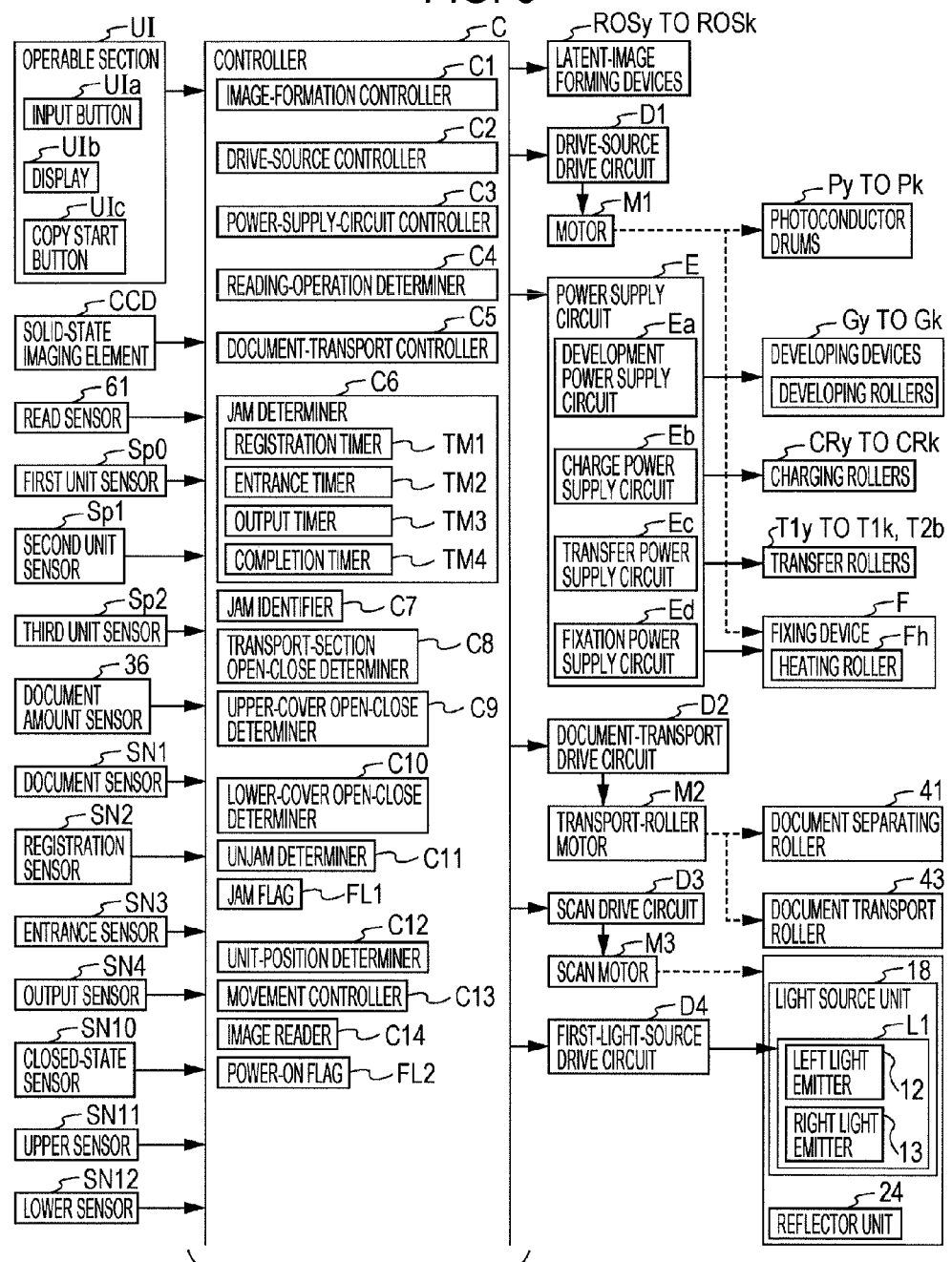
FIG. 6 is a block diagram illustrating functions included in a controller of the image forming apparatus according to the first exemplary embodiment.

FIG. 6 is a block diagram illustrating functions included in a controller of the image forming apparatus according to the first exemplary embodiment.

Figure 7:
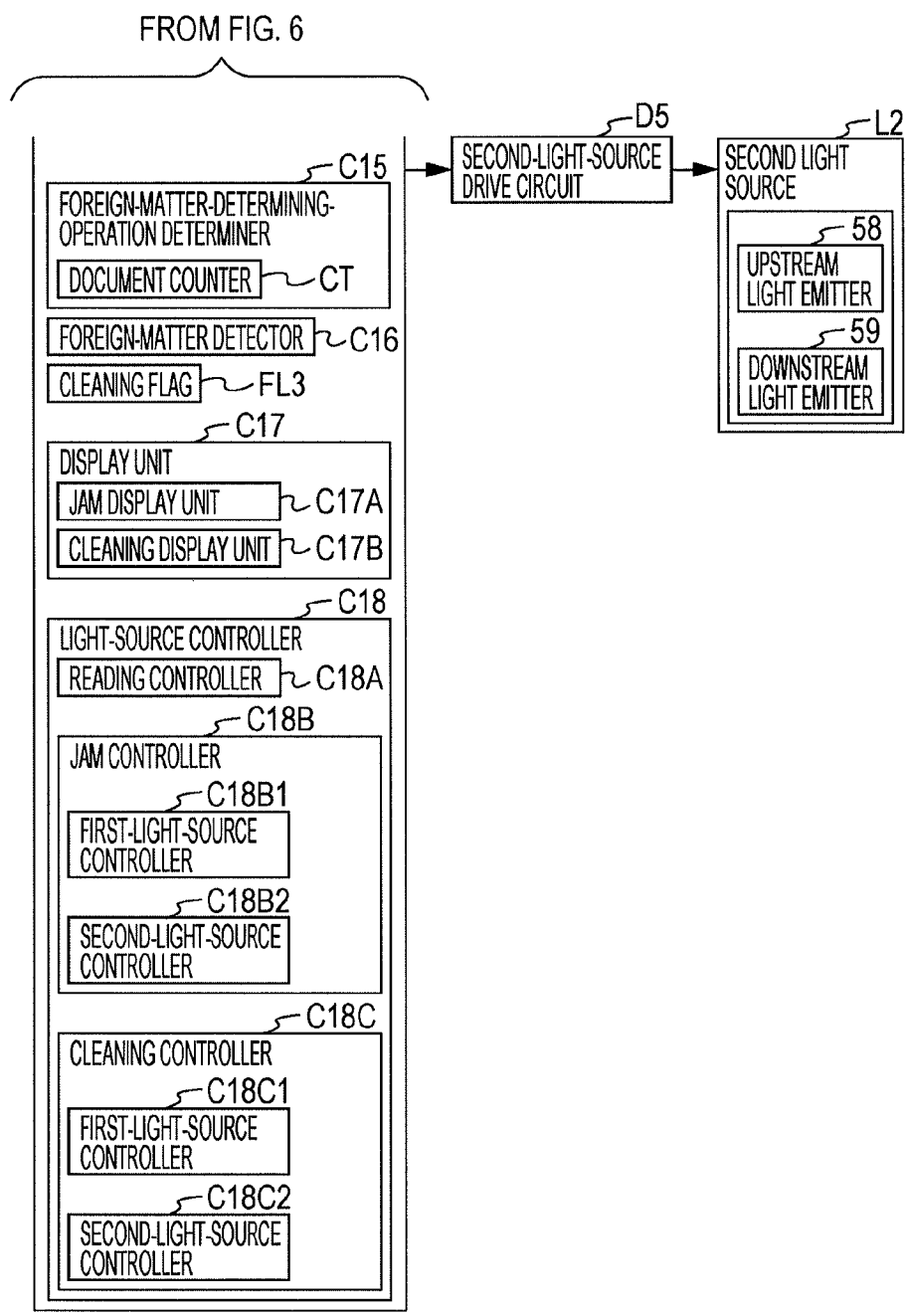
FIG. 7 is a block diagram illustrating functions included in the controller of the image forming apparatus according to the first exemplary embodiment and continues from FIG. 6.

FIG. 7 is also a block diagram illustrating functions included in the controller of the image forming apparatus according to the first exemplary embodiment and continues from FIG. 6.

In FIGS. 6 and 7, a controller C of the copier U has an input-output interface I/O used for receiving and outputting a signal from and to the outside. The controller C also has a read-only memory (ROM) that stores, for example, programs and information used for performing processes. Moreover, the controller C has a random access memory (RAM) that temporarily stores data. The controller C also has a central processing unit (CPU) that performs a process in accordance with a program stored in, for example, the ROM. Therefore, the controller C according to the first exemplary embodiment is constituted by a small-size information processing device, that is, a so-called microcomputer. Accordingly, the controller C is capable of realizing various functions by executing the programs stored in, for example, the ROM.

Signal Output Components Connected to Controller C of Image Forming Section U3

The controller C of the image forming section U3 receives output signals from signal output components, such as the operable section UI, the solid-state imaging element CCD, the read sensor 61, and the sensors Sp0 to Sp2, 36, SN1 to SN4, and SN10 to SN12.

The operable section UI includes the input buttons UIa, such as a button for inputting the number of print sheets and an arrow button, the display UIb as an example of a notifying member, and a copy start button UIc as an example of an input member for inputting start of a copying operation or a document reading operation.

The solid-state imaging element CCD reads a first-face image of a document Gi passing the first-face read position P1.

The read sensor 61 reads a second-face image of a document Gi passing the second-face read position P2.

The unit sensors Sp0 to Sp2 detect the presence or absence of the light source unit 18 and detect whether or not the units 18 and 24 have moved to the detection positions of the unit sensors Sp0 to Sp2.

The document amount sensor 36 detects the presence or absence of the ascendable-descendible plate 33 or a document Gi so as to detect the amount of documents Gi.

The document sensor SN1 detects the presence or absence of a document Gi on the ascendable-descendible plate 33.

The registration sensor SN2, the entrance sensor SN3, and the output sensor SN4 each detect the presence or absence of a document Gi.

A closed-state sensor SN10 detects whether or not the document transport device U1a is located at a readable position at which the document base PG is in a covered state.

The upper sensor SN11 detects the presence or absence of the upper cover 71 so as to detect whether the upper cover 71 is open or closed.

The lower sensor SN12 detects the presence or absence of the lower cover 81 so as to detect whether the lower cover 81 is open or closed.

Controlled Components Connected to Controller C of Image Forming Section U3

The controller C of the image forming section U3 is connected to a drive-source drive circuit D1, a document-transport drive circuit D2, a scan drive circuit D3, light-source drive circuits D4 and D5, a power supply circuit E, and other controlled components (not shown). The controller C outputs control signals to, for example, the circuits D1 to D5 and E.

The drive-source drive circuit D1 rotationally drives, for example, photoconductor drums Py to Pk as an example of image bearing members and the intermediate transfer belt B via a motor M1 as an example of a drive source.

The document-transport drive circuit D2 as an example of a document-transport-device drive circuit drives a transport-roller motor M2 as an example of a document-transport drive source so as to rotationally drive, for example, the separating roller 41 and the transport roller 43 disposed in the document transport path GH.

The scan drive circuit D3 drives a scan motor M3 as an example of a scan drive source so as to move the light source unit 18 and the reflector unit 24 in the left-right direction along the lower surface of the document base PG via, for example, a gear (not shown).

The first-light-source drive circuit D4 as an example of a first-light-source-member drive circuit supplies electric power to the left light emitter 12 and the right light emitter 13 of the first light source L1. In the first exemplary embodiment, the first-light-source drive circuit D4 supplies electric power to each of the white LEDs of the light emitters 12 and 13 and is capable of adjusting the light intensities of the light emitters 12 and 13 based on the ratio of the number of white LEDs in on and off states.

The second-light-source drive circuit D5 as an example of a second-light-source-member drive circuit supplies electric power to the upstream light emitter 58 and the downstream light emitter 59 of the second light source L2. In the first exemplary embodiment, the second-light-source drive circuit D5 supplies electric power to each of the white LEDs of the light emitters 58 and 59 and is capable of adjusting the light intensities of the light emitters 58 and 59 based on the ratio of the number of white LEDs in on and off states.

The power supply circuit E includes a development power supply circuit Ea, a charge power supply circuit Eb, a transfer power supply circuit Ec, and a fixation power supply circuit Ed.

The development power supply circuit Ea applies development voltage to developing rollers of the developing devices Gy to Gk.

The charge power supply circuit Eb applies charge voltage to the charging rollers CRy to CRk so as to electrostatically charge the surfaces of the photoconductor drums Py to Pk.

The transfer power supply circuit Ec applies transfer voltage to the second-transfer roller T2b via the first-transfer rollers T1y to T1k and the contact roller T2c.

The fixation power supply circuit Ed supplies electric power for heating the heating roller Fh of the fixing device F.

Functions of Controller C of Image Forming Section U3

The controller C of the image forming section U3 has a function of executing processing according to input signals from the signal output components and outputting control signals to the controlled components. Specifically, the controller C has the following functions.

An image-formation controller C1 controls, for example, the driving of each component in the copier U and the voltage application timing in accordance with image information input from the solid-state imaging element CCD or the read sensor 61 of the scanner section U1 so as to execute a job, which is an image forming operation.

A drive-source controller C2 controls the driving of the motor M1 via the drive-source drive circuit D1 so as to control the driving of, for example, the photoconductor drums Py to Pk.

A power-supply-circuit controller C3 controls the power supply circuits Ea to Ed so as to control the voltage to be applied to each component and the electric power to be supplied to each component.

A reading-operation determiner C4 determines whether a reading operation to be executed when the copy start button UIc is input is an automatic reading operation or a manual reading operation based on a detection result of the document sensor SN1. When the copy start button UIc is input, the reading-operation determiner C4 according to the first exemplary embodiment determines that the automatic reading operation is to be executed if the document sensor SN1 detects a document Gi on the ascendable-descendible plate 33. Furthermore, when the copy start button UIc is input, the reading-operation determiner C4 according to the first exemplary embodiment determines that the manual reading operation is to be executed if the document sensor SN1 does not detect a document Gi, that is, if there is no document Gi on the ascendable-descendible plate 33.

A document-transport controller C5 controls the driving of, for example, the ascending-descending rod 34, the separating roller 41, and the transport roller 43 via the document-transport drive circuit D2. If it is determined that the automatic reading operation is to be executed, the document-transport controller C5 according to the first exemplary embodiment drives the ascending-descending rod 34 so as to cause the ascendable-descendible plate 33 to ascend. Furthermore, the document-transport controller C5 drives, for example, the separating roller 41 and the transport roller 43 in the document transport path GH. Then, the document-transport controller C5 drives the nudging roller 37 at a predetermined timing so as to transport a document Gi from the document feed tray U1a1. When there is no document Gi remaining on the ascendable-descendible plate 33, the document-transport controller C5 causes the ascended ascendable-descendible plate 33 to descend to its original position.

A jam determiner C6 as an example of a jam-occurrence determiner has timers TM1 to TM4. Based on detection results of the sensors SN2 to SN4 and detection results of the timers TM1 to TM4, the jam determiner C6 determines whether or not a document Gi is jammed in the document transport path GH. If any one of the timers TM1 to TM4 that have started a timekeeping process reaches a time-up point, the jam determiner C6 according to the first exemplary embodiment determines that a document Gi is jammed in the document transport path GH, that is, a jam has occurred.

A registration timer TM1 as an example of a first timekeeper performs a timekeeping process for measuring a predetermined time period based on a scheduled time from a time point at which a document Gi is transported to a time point at which the document Gi reaches the registration sensor SN2 and also based on a margin. The registration timer TM1 starts this timekeeping process every time the nudging roller 37 is driven. When the document Gi reaches the registration sensor SN2, the registration timer TM1 discontinues the timekeeping process.

An entrance timer TM2 as an example of a second timekeeper performs a timekeeping process for measuring a predetermined time period based on a scheduled time from a time point at which a document Gi passes the registration sensor SN2 to a time point at which the document Gi reaches the entrance sensor SN3 and also based on a margin. The entrance timer TM2 starts this timekeeping process every time the registration sensor SN2 detects a document Gi. When the document Gi reaches the entrance sensor SN3, the entrance timer TM2 discontinues the timekeeping process.

An output timer TM3 as an example of a third timekeeper performs a timekeeping process for measuring a predetermined time period based on a scheduled time from a time point at which a document Gi passes the entrance sensor SN3 to a time point at which the document Gi reaches the output sensor SN4 and also based on a margin. The output timer TM3 starts this timekeeping process every time the entrance sensor SN3 detects a document Gi. When the document Gi reaches the output sensor SN4, the output timer TM3 discontinues the timekeeping process.

A completion timer TM4 as an example of a fourth timekeeper performs a timekeeping process for measuring a predetermined time period based on a scheduled time from a time point at which the leading edge of a document Gi in the transport direction passes the output sensor SN4 to a time point at which the trailing edge of the largest document readable by the document transport device U1a passes the output sensor SN4 and also based on a margin. The completion timer TM4 starts this timekeeping process every time the output sensor SN4 detects a document Gi. When the trailing edge of the document Gi passes the output sensor SN4, the completion timer TM4 discontinues the timekeeping process.

FIG. 8 illustrates jams occurring in the first exemplary embodiment.

A jam identifier C7 as an example of a jam determiner identifies the position of a jam. The jam identifier C7 according to the first exemplary embodiment determines whether or not a document Gi is jammed in a first predetermined range near the first-face read position P1 and whether or not a document Gi is jammed in a second predetermined range near the second-face read position P2. Referring to FIG. 8, in the first exemplary embodiment, a transport path upstream of the detection position of the entrance sensor SN3, that is, the first transport path GH1, is set as an example of the first range. Furthermore, a transport path downstream of the detection position of the entrance sensor SN3, that is, the second transport path GH2, is set as an example of the second range.

In FIG. 8, when the registration timer TM1 reaches a time-up point, the jam identifier C7 according to the first exemplary embodiment determines that a jam J1 has occurred before the document Gi reaches the registration sensor SN2.

When the entrance timer TM2 reaches a time-up point, the jam identifier C7 determines whether or not the registration sensor SN2 is in an on state. If the registration sensor SN2 is in an on state, the jam identifier C7 determines that a jam J2 has occurred before the document Gi reaches the entrance sensor SN3 in a state where the document Gi extends astride the registration sensor SN2. If the registration sensor SN2 is in an off state, the jam identifier C7 determines that a jam J3 has occurred between the registration sensor SN2 and the entrance sensor SN3.

Furthermore, when the output timer TM3 reaches a time-up point, the jam identifier C7 determines whether or not the entrance sensor SN3 is in an on state. If the entrance sensor SN3 is in an on state, the jam identifier C7 determines that a jam j4 has occurred before the document Gi reaches the output sensor SN4 in a state where the document Gi extends astride the entrance sensor SN3. If the entrance sensor SN3 is in an off state, the jam identifier C7 determines that a jam j5 has occurred between the entrance sensor SN3 and the output sensor SN4.

When the completion timer TM4 reaches a time-up point, the jam identifier C7 determines whether or not the entrance sensor SN3 is in an on state and the output sensor SN4 is in an on state. If the entrance sensor SN3 is in an on state and the output sensor SN4 is in an on state, the jam identifier C7 determines that a jam J6 has occurred in a state where the document Gi is partially output from the document transport path GH and extends astride the entrance sensor SN3. If the entrance sensor SN3 is in an off state and the output sensor SN4 is in an on state, the jam identifier C7 determines that a jam J7 has occurred in a state where the document Gi is partially output from the document transport path GH and has already passed the entrance sensor SN3.

Thus, when the jam identifier C7 according to the first exemplary embodiment identifies any one of the jams J1 to J3, the jam identifier C7 determines that the document Gi is jammed in the first transport path GH1. Furthermore, when the jam identifier C7 according to the first exemplary embodiment identifies one of the jams J5 and J7, the jam identifier C7 determines that the document Gi is jammed in the second transport path GH2. Moreover, when the jam identifier C7 according to the first exemplary embodiment identifies one of the jams J4 and J6, the jam identifier C7 determines that the document Gi is jammed astride the first transport path GH1 and the second transport path GH2.

A transport-section open-close determiner C8 determines that the document transport device U1a is at the readable position when the closed-state sensor SN10 is in an on state. When the closed-state sensor SN10 is in an off state, the transport-section open-close determiner C8 determines that the document transport device U1a is at the working position.

An upper-cover open-close determiner C9 determines that the upper cover 71 is at the normal position when the upper sensor SN11 is in an on state. When the upper sensor SN11 is in an off state, the upper-cover open-close determiner C9 determines that the upper cover 71 is at the open position.

A lower-cover open-close determiner C10 determines that the lower cover 81 is at the normal position when the lower sensor SN12 is in an on state. When the lower sensor SN12 is in an off state, the lower-cover open-close determiner C10 determines that the lower cover 81 is at the open position.

An unjam determiner C11 as an example of a jam-removal determiner determines whether or not a jam has been removed. With regard to each of the jams J2, J4, J6, and J7 located astride the sensors SN2 to SN4, the unjam determiner C11 according to the first exemplary embodiment determines that the jam has been removed when all of the sensors SN2 to SN4 are in an off state. With regard to each of the jams J1, J3, and J5 that are not located astride the sensors SN2 to SN4, the unjam determiner C11 according to the first exemplary embodiment determines that the jam has been removed when the openable-closable members U1a, 71, and 81 corresponding to the positions of the jams J1, J3, and J5 are opened and closed and all of the sensors SN2 to SN4 are in an off state.

Specifically, in FIG. 8, if the jam J1 occurs before the document Gi reaches the registration sensor SN2, the unjam determiner C11 according to the first exemplary embodiment determines that the jam J1 is removed when the upper cover 71 has been moved to the normal position after being moved to the open position and the sensors SN2 to SN4 are all in an off state. If the jam J3 occurs between the registration sensor SN2 and the entrance sensor SN3, the unjam determiner C11 according to the first exemplary embodiment determines that the jam J3 is removed when the document transport device U1a has been moved to the readable position after being moved to the working position and the sensors SN2 to SN4 are all in an off state. If the jam j5 occurs between the entrance sensor SN3 and the output sensor SN4, the unjam determiner C11 according to the first exemplary embodiment determines that the jam j5 is removed when the document transport device U1a has been moved to the readable position after the lower cover 81 is moved to the open position and the sensors SN2 to SN4 are all in an off state.

A jam flag FL1 as an example of a jam identifier has an initial value of "000". As shown in FIG. 8, the jam flag FL1 becomes "001" when the jam J1 occurs. Likewise, the jam flag FL1 becomes "010" when the jam J2 occurs, becomes "011" when the jam J3 occurs, becomes "100" when the jams J4 and J6 occur, becomes "101" when the jam j5 occurs, and becomes "110" when the jam J7 occurs. When the jam is removed, the jam flag FL1 becomes "000".

A unit-position determiner C12 determines the positions of the light source unit 18 and the reflector unit 24 based on detection results of the unit sensors Sp0 to Sp2. In the first exemplary embodiment, when the first unit sensor Sp0 detects the light source unit 18, the unit-position determiner C12 determines that the units 18 and 24 have moved to the home position Q10. When the second unit sensor Sp1 detects the light source unit 18, the unit-position determiner C12 determines that the units 18 and 24 have moved to the left-end position Q11 corresponding to the first-face read position P1. When the third unit sensor Sp2 detects the light source unit 18, the unit-position determiner C12 determines that the units 18 and 24 have moved to the right-end position Q12 corresponding to the right end of the manual read region SE.

A movement controller C13 as an example of a unit-position controller controls the scan motor M3 so as to move the light source unit 18 and the reflector unit 24 in the left-right direction as an example of a second scanning direction. The movement controller C13 according to the first exemplary embodiment controls the movement of the units 18 and 24 based on the determination result of the unit-position determiner C12. In the first exemplary embodiment, when the automatic reading operation, a foreign-matter determining operation, or a notifying operation, which will be described later, is to be executed, the movement controller C13 moves the units 18 and 24 to the left-end position Q11. Then, when the image reading operation or the notifying operation is completed, the movement controller C13 moves the units 18 and 24 to the home position Q10. When the manual reading operation is to be executed, the movement controller C13 causes the units 18 and 24 to scan a document Gi by moving them from the home position Q10 to the right-end position Q12. Then, when the document Gi is completely scanned, the movement controller C13 moves the units 18 and 24 to the home position Q10.

An image reader C14 reads an image of a document Gi or an image at the read position P1 or P2 based on an output from the solid-state imaging element CCD or the read sensor 61. When executing the automatic reading operation in which both the first and second faces of a document Gi are to be read, the image reader C14 according to the first exemplary embodiment reads the first-face image of the document Gi based on an output from the solid-state imaging element CCD and reads the second-face image of the document Gi based on an output from the read sensor 61. When executing the automatic reading operation in which only the first-face image of a document Gi is to be read or when executing the manual reading operation, the image reader C14 according to the first exemplary embodiment reads the image of the document Gi based on an output from the solid-state imaging element CCD. When executing the foreign-matter determining operation, the image reader C14 according to the first exemplary embodiment reads an image at the first-face read position P1 based on an output from the solid-state imaging element CCD and reads an image at the second-face read position P2 based on an output from the read sensor 61.

A power-on flag FL2 as an example of a power-supply identifier has an initial value of "0". The power-on flag FL2 becomes "1" when the power of the copier U is turned on. When the power of the copier U is turned off, the power-on flag FL2 is reset to "0".

A foreign-matter-determining-operation determiner C15 as an example of a cleaning-determination-timing determiner has a document counter CT. The foreign-matter-determining-operation determiner C15 determines whether or not the foreign-matter determining operation is to be performed. When the power of the copier U is turned on, that is, when the power-on flag FL2 is "0", the foreign-matter-determining-operation determiner C15 according to the first exemplary embodiment determines that the foreign-matter determining operation be performed. Furthermore, when the number ct of transported documents Gi is larger than or equal to a predetermined threshold value ct0, the foreign-matter-determining-operation determiner C15 according to the first exemplary embodiment determines that the foreign-matter determining operation be performed. Moreover, when a jam is removed, that is, when the jam flag FL1 changes to "000", the foreign-matter-determining-operation determiner C15 according to the first exemplary embodiment determines that the foreign-matter determining operation be performed.

The document counter CT as an example of a number-of-transported-media measurer measures the number ct of documents Gi transported by the document transport device U1a. The document counter CT according to the first exemplary embodiment measures the number of times the nudging roller 37 is driven as the number ct of transported documents Gi. When it is determined that the number ct of transported documents Gi is larger than or equal to the threshold value ct0, the document counter CT is reset to "0". Furthermore, the document counter CT is reset to "0" when the power of the copier U is turned off.

A foreign-matter detector C16 as an example of a cleaning determiner determines whether or not cleaning is to be performed at the read positions P1 and P2. If foreign matter is detected at the read positions P1 and P2, the foreign-matter detector C16 according to the first exemplary embodiment determines that the read positions P1 and P2 should be cleaned. If no foreign matter is detected at the read positions P1 and P2, the foreign-matter detector C16 determines that the read positions P1 and P2 do not have to be cleaned. In the first exemplary embodiment, the foreign-matter detector C16 detects whether or not there is foreign matter, such as paper particles, dust, or user's fingerprint, at the read positions P1 and P2 based on an image read by the image reader C14 during the foreign-matter determining operation. The foreign-matter detector C16 according to the first exemplary embodiment performs the above determination process for each of the read positions P1 and P2. With regard to the configuration of the foreign-matter detector C16 for detecting foreign matter based on an image, a configuration in the related art is applicable, such as the configuration discussed in Japanese Unexamined Patent Application Publication No. 2012-80169 in which foreign matter is detected based on whether or not an output in the first scanning direction exceeds a threshold value. Therefore, a detailed description of the configuration of the foreign-matter detector C16 for detecting foreign matter will be omitted.

A cleaning flag FL3 as an example of a cleaning identifier has an initial value of "00". If it is determined that the first-face read position P1 should be cleaned but the second-face read position P2 does not have to be cleaned, the cleaning flag FL3 becomes "01". If it is determined that the first-face read position P1 does not have to be cleaned but the second-face read position P2 should be cleaned, the cleaning flag FL3 becomes "10". If it is determined that both the first-face read position P1 and the second-face read position P2 should be cleaned, the cleaning flag FL3 becomes "11". When the operable section UI receives an input indicating that cleaning is completed, the cleaning flag FL3 becomes "00".

Figure 9A:
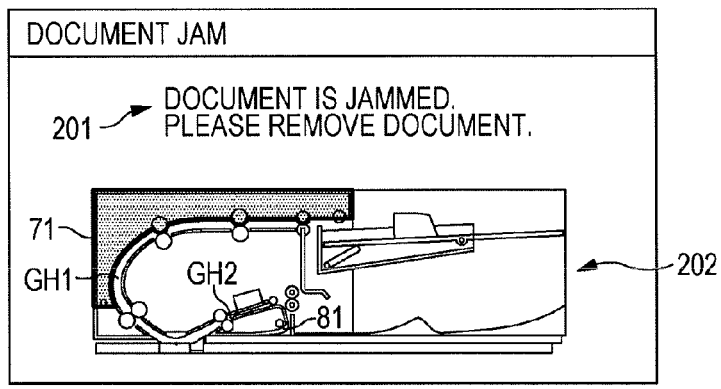
FIGS. 9A to 9C illustrate images displayed on a display according to the first exemplary embodiment when a jam occurs, FIG. 9A illustrating an image that draws attention to the upper cover, FIG. 9B illustrating an image that draws attention to the lower cover, FIG. 9C illustrating an image that draws attention to the upper cover and the lower cover.
Figure 9B:
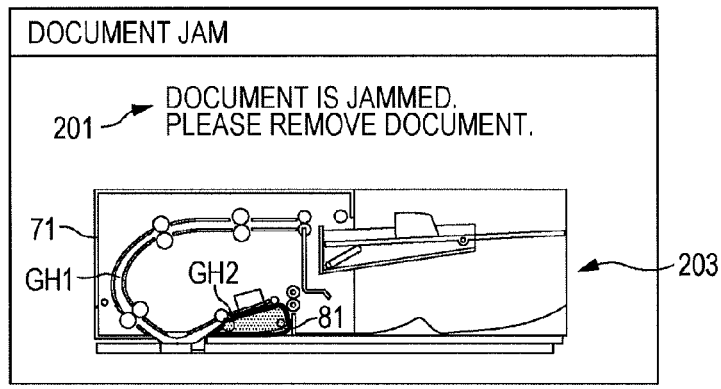
Figure 9C:
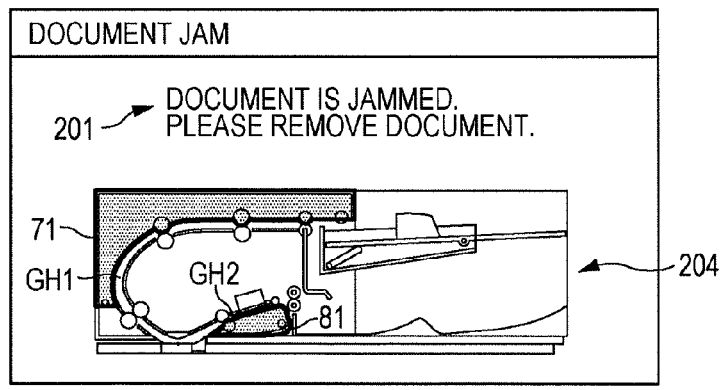

FIGS. 9A to 9C illustrate images displayed on the display UIb according to the first exemplary embodiment when a jam occurs. Specifically, FIG. 9A illustrates an image that draws attention to the upper cover 71, FIG. 9B illustrates an image that draws attention to the lower cover 81, and FIG. 9C illustrates an image that draws attention to the upper cover 71 and the lower cover 81.

Figure 10A:
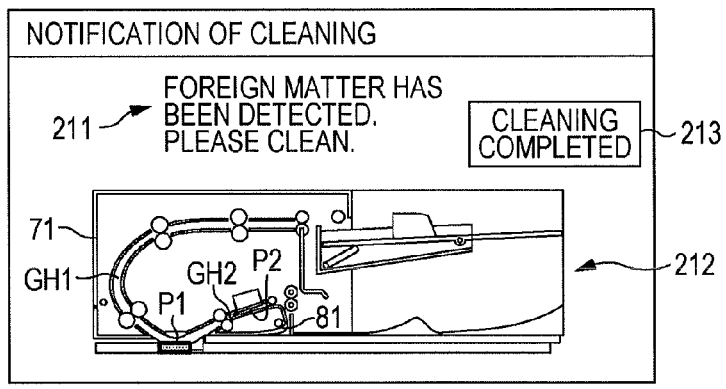
FIGS. 10A to 10C illustrate images displayed on the display according to the first exemplary embodiment when cleaning should be performed, FIG. 10A illustrating an image that prompts a user to clean a first-face read position, FIG. 10B illustrating an image that prompts the user to clean a second-face read position, FIG. 10C illustrating an image that prompts the user to clean the first-face read position and the second-face read position.
Figure 10B:
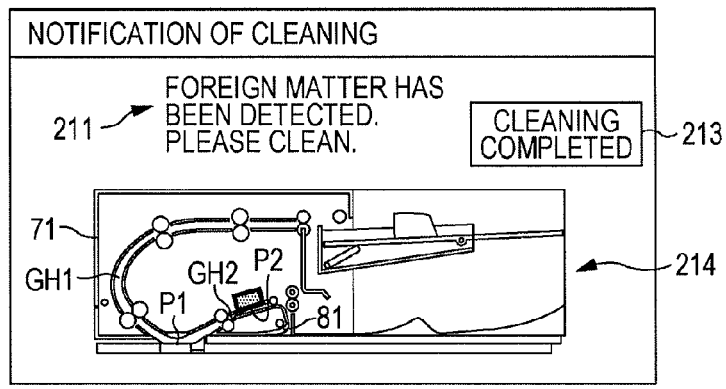
Figure 10C:
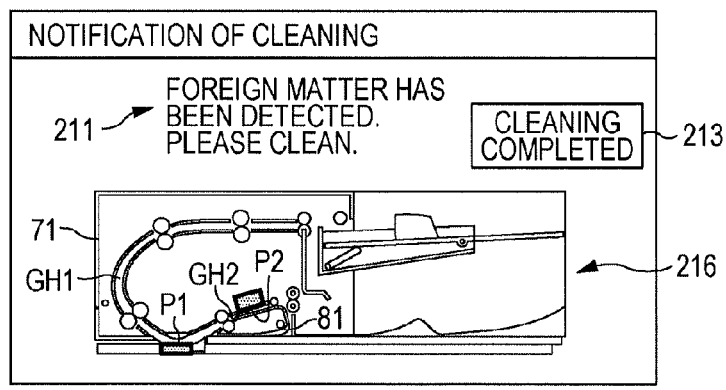

FIGS. 10A to 10C illustrate images displayed on the display UIb according to the first exemplary embodiment when cleaning should be performed. Specifically, FIG. 10A illustrates an image that prompts the user to clean the first-face read position P1, FIG. 10B illustrates an image that prompts the user to clean the second-face read position P2, and FIG. 10C illustrates an image that prompts the user to clean the first-face read position P1 and the second-face read position P2.

A display unit C17 as an example of a notifier has a jam display unit C17A and a cleaning display unit C17B. In FIGS. 9A to 9C and 10A to 10C, the display unit C17 according to the first exemplary embodiment causes the display UIb of the operable section UI as an example of a notifying member to display a notification of the occurrence of a jam or to display a notification image for prompting the user to perform cleaning.

The jam display unit C17A displays notification images 201 to 204 in accordance with any one of the jams J1 to J7 when any one of the jams J1 to J7 is detected based on detection results of the sensors SN2 to SN4. Specifically, as shown in FIG. 9A, when the jam J1 or J2 occurs, the jam display unit C17A according to the first exemplary embodiment displays a text image 201 notifying the user that a jam has occurred and an image 202 that draws attention to the upper cover 71. Furthermore, as shown in FIG. 9B, when the jam J3 or one of the jams J5 and J7 occurs, the jam display unit C17A displays the text image 201 and an image 203 that draws attention to the lower cover 81. Moreover, as shown in FIG. 9C, when the jam J4 or J6 occurs, the jam display unit C17A displays the text image 201 and an image 204 that draws attention to the upper cover 71 and the lower cover 81.

The cleaning display unit C17B displays notification images 211 to 214 that prompt the user to clean the read positions P1 and P2 if it is determined that the read positions P1 and P2 should be cleaned. Specifically, as shown in FIG. 10A, if only the first-face read position P1 should be cleaned, the cleaning display unit C17B according to the first exemplary embodiment displays a text image 211 prompting the user to perform cleaning, an image 212 indicating the first-face read position P1, and a button image 213 to be input when the cleaning is completed. As shown in FIG. 10B, if only the second-face read position P2 should be cleaned, the cleaning display unit C17B according to the first exemplary embodiment displays the text image 211, an image 214 indicating the second-face read position P2, and the button image 213. As shown in FIG. 10C, if both the first-face read position P1 and the second-face read position P2 should be cleaned, the cleaning display unit C17B according to the first exemplary embodiment displays the text image 211, an image 216 indicating the first-face read position P1 and the second-face read position P2, and the button image 213.

A light-source controller C18 as an example of a light-source-member controller has a reading controller C18A, a jam controller C18B, and a cleaning controller C18C. The light-source controller C18 controls the light sources L1 and L2 via the light-source drive circuits D4 and D5. Specifically, the light-source controller C18 controls on-off operation of the light sources L1 and L2 as well as the light intensities when the light sources L1 and L2 are turned on. In the light-intensity control in the first exemplary embodiment, when the light emitters 12, 13, 58, and 59 of the light sources L1 and L2 are to be turned on, the LEDs constituting the light emitters 12 to 59 are partially turned off while the remaining LED or LEDs is/are turned on, thereby reducing the light intensities.

When the image reader C14 is to read an image, the reading controller C18A turns on the first light source L1 and the second light source L2 in accordance with predetermined reading light intensities. When an image is to be read based on an output from the solid-state imaging element CCD, the reading controller C18A according to the first exemplary embodiment turns on the first light source L1. When an image is to be read based on an output from the read sensor 61, the reading controller C18A according to the first exemplary embodiment turns on the second light source L2. In the first exemplary embodiment, when the light sources L1 and L2 are to be turned on in accordance with reading light intensities, all of the LEDs of the light emitters 12 to 59 are turned on.

The jam controller C18B as an example of a light-source-member lighting unit corresponding to when a medium is jammed has a first-light-source controller C18B1 and a second-light-source controller C18B2. The jam controller C18B turns on the first light source L1 when a document Gi is jammed in the first transport path GH1. The jam controller C18B turns on the second light source L2 when a document Gi is jammed in the second transport path GH2. Furthermore, when a document Gi is jammed astride both the first transport path GH1 and the second transport path GH2, the jam controller C18B causes the second light source L2 corresponding to the second transport path GH2 from which the document Gi should be removed by priority to blink, and causes the first light source L1 corresponding to the first transport path GH1 from which the document Gi should be removed afterwards to glow. The removing order of priority in this case is preset based on, for example, workability of the user who removes the document Gi and the durability of the document Gi during the removing process in the document transport device U1a. In the first exemplary embodiment, if a document Gi extends astride both transport paths GH1 and GH2, the removing order is preset such that the document Gi is removed from the second transport path GH2 by priority and is subsequently removed from the first transport path GH1.

The first-light-source controller C18B1 controls the first light source L1 when any one of the jams J1 to J4 and J6 occurs. The first-light-source controller C18B1 turns on the first light source L1 in accordance with a light intensity lower than that when reading an image. In the first exemplary embodiment, the LEDs of the light emitters 12 and 13 of the first light source L1 are partially turned on so as to reduce the light intensity of the first light source L1. If the document transport device U1a is not open based on a detection result of the closed-state sensor SN10, the first-light-source controller C18B1 increases the light intensity of the first light source L1, as compared with a case where the document transport device U1a is open. In the first exemplary embodiment, when the document transport device U1a is open, the light emitter 13 alone is partially turned on. When the document transport device U1a is closed, the light intensity of the first light source L1 is increased by partially turning on both light emitters 12 and 13.

Specifically, if any one of the jams J1 to J3 occurs within the first transport path GH1 or if one of the jams J4 and J6 occurs astride the first transport path GH1 and the second transport path GH2, the first-light-source controller C18B1 according to the first exemplary embodiment partially turns on the light emitters 12 and 13 in the light source unit 18 that has moved to the left-end position Q11. Then, when the document transport device U1a is moved to the working position, the first-light-source controller C18B1 turns off the left light emitter 12 and maintains the right light emitter 13 in a partially on state. Furthermore, when it is determined that the jam has been removed, the first-light-source controller C18B1 turns off the light emitters 12 and 13. If the jam is not removed and the document transport device U1a is moved to the readable position, the first-light-source controller C18B1 partially turns on the left light emitter 12 and maintains the right light emitter 13 in a partially on state.

The second-light-source controller C18B2 controls the second light source L2 when any one of the jams J4 to J7 occurs. The second-light-source controller C18B2 turns on the second light source L2 in accordance with a light intensity lower than that when reading an image. In the first exemplary embodiment, the LEDs of the light emitters 58 and 59 of the second light source L2 are partially turned on so as to reduce the light intensity of the second light source L2. If the lower cover 81 is not open based on a detection result of the lower sensor SN12, the second-light-source controller C18B2 increases the light intensity of the second light source L2, as compared with a case where the lower cover 81 is open. In the first exemplary embodiment, when the lower cover 81 is open, the light emitter 58 alone is partially turned on. When the lower cover 81 is closed, the light intensity of the second light source L2 is increased by partially turning on both light emitters 58 and 59.

Specifically, if one of the jams J5 and J7 occurs within the second transport path GH2, the second-light-source controller C18B2 according to the first exemplary embodiment partially turns on the light emitters 58 and 59. In this case, when the lower cover 81 is moved to the open position, the second-light-source controller C18B2 maintains the upstream light emitter 58 in a partially on state and turns off the downstream light emitter 59. Furthermore, when it is determined that the jam has been removed, the second-light-source controller C18B2 turns off the light emitters 58 and 59. If the jam is not removed and the lower cover 81 is moved to the normal position, the second-light-source controller C18B2 maintains the upstream light emitter 58 in a partially on state and partially turns on the downstream light emitter 59.

If one of the jams J4 and J6 occurs astride the first transport path GH1 and the second transport path GH2, the second-light-source controller C18B2 according to the first exemplary embodiment turns on the light emitters 58 and 59 of the second light source L2 in a blinking mode. The blinking mode of the light emitters 58 and 59 is executed by repeating on and off operations in a cycle sufficiently perceivable by the user. When the lower cover 81 is moved to the open position, the second-light-source controller C18B2 switches the upstream light emitter 58 from the blinking mode to a partially on state and turns off the downstream light emitter 59. Furthermore, when the entrance sensor SN3 changes to an off state, the second-light-source controller C18B2 turns off the light emitters 58 and 59. If the lower cover 81 is moved to the normal position while the entrance sensor SN3 remains in an on state, the second-light-source controller C18B2 switches the upstream light emitter 58 from a partially on state to a blinking mode and switches the downstream light emitter 59 from an off state to a blinking mode.

The cleaning controller C18C as an example of a lighting unit when the read positions should be cleaned has a first-light-source controller C18C1 and a second-light-source controller C18C2. If the first-face read position P1 should be cleaned, the cleaning controller C18C turns on the first light source L1. If the second-face read position P2 should be cleaned, the cleaning controller C18C turns on the second light source L2.

The first-light-source controller C18C1 controls the first light source L1 when the first-face read position P1 should be cleaned. The first-light-source controller C18C1 turns on the first light source L1 in accordance with a light intensity lower than that when reading an image. If the document transport device U1a is not open based on a detection result of the closed-state sensor SN10, the first-light-source controller C18C1 increases the light intensity of the first light source L1, as compared with a case where the document transport device U1a is open.

Specifically, when the first-face read position P1 alone should be cleaned or when both the first-face read position P1 and the second-face read position P2 should be cleaned, the first-light-source controller C18C1 according to the first exemplary embodiment partially turns on the light emitters 12 and 13 of the first light source L1 in the light source unit 18 that has moved to the left-end position Q11. Furthermore, when an input indicating that cleaning is completed is received, the first-light-source controller C18C1 turns off the light emitters 12 and 13. With regard to the configuration in the first-light-source controller C18C1 for controlling the light emitters 12 and 13 based on the open/closed state of the document transport device U1a from when the light emitters 12 and 13 are first partially turned on to when the light emitters 12 and 13 are turned off, the control is performed similarly to the control performed by the first-light-source controller C18B1 when a jam occurs. Therefore, the first-light-source controller C18C1 corresponding to cleaning will not be described in further detail.

The second-light-source controller C18C2 controls the second light source L2 when the second-face read position P2 should be cleaned. The second-light-source controller C18C2 turns on the second light source L2 in accordance with a light intensity lower than that when reading an image. If the lower cover 81 is not open based on a detection result of the lower sensor SN12, the second-light-source controller C18C2 increases the light intensity of the second light source L2, as compared with a case where the lower cover 81 is open.

Specifically, when the second-face read position P2 alone should be cleaned or when both the first-face read position P1 and the second-face read position P2 should be cleaned, the second-light-source controller C18C2 according to the first exemplary embodiment partially turns on the light emitters 58 and 59 of the second light source L2. Furthermore, when an input indicating that cleaning is completed is received, the second-light-source controller C18C2 turns off the light emitters 58 and 59. With regard to the configuration in the second-light-source controller C18C2 for controlling the light emitters 58 and 59 based on the open/closed state of the lower cover 81 from when the light emitters 58 and 59 are first partially turned on to when the light emitters 58 and 59 are turned off, the control is performed similarly to the control performed by the second-light-source controller C18B2 when one of the jams J5 and J7 occurs within the second transport path GH2. Therefore, the second-light-source controller C18C2 corresponding to cleaning will not be described in further detail.

Flowchart According to First Exemplary Embodiment

Next, the flow of control performed in the copier U according to the first exemplary embodiment will be described with reference to a flowchart.

Flowchart of Jam Detection Process

Figure 11:
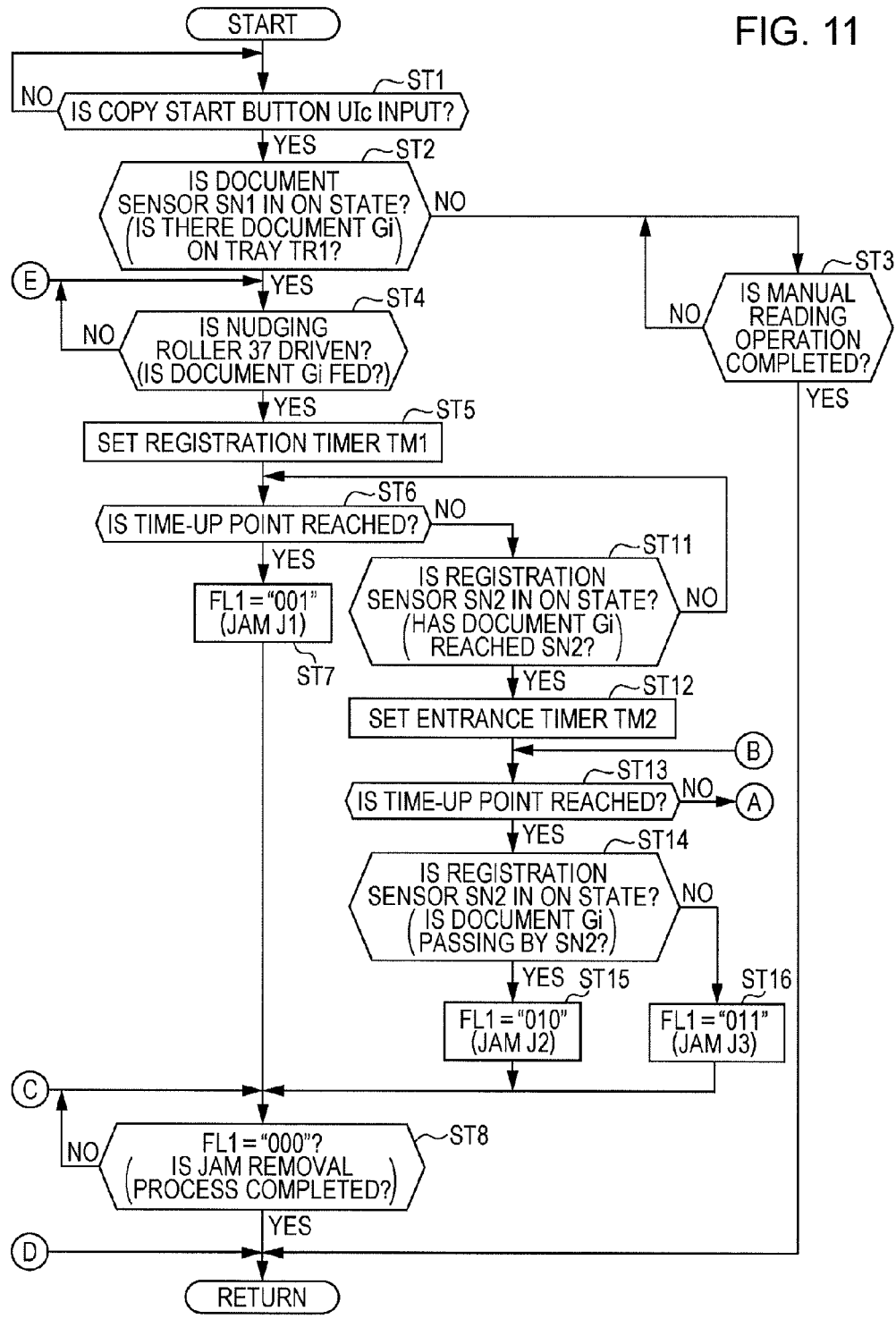
FIG. 11 is a flowchart of a jam detection process according to the first exemplary embodiment.

FIG. 11 is a flowchart of a jam detection process according to the first exemplary embodiment.

Figure 12:
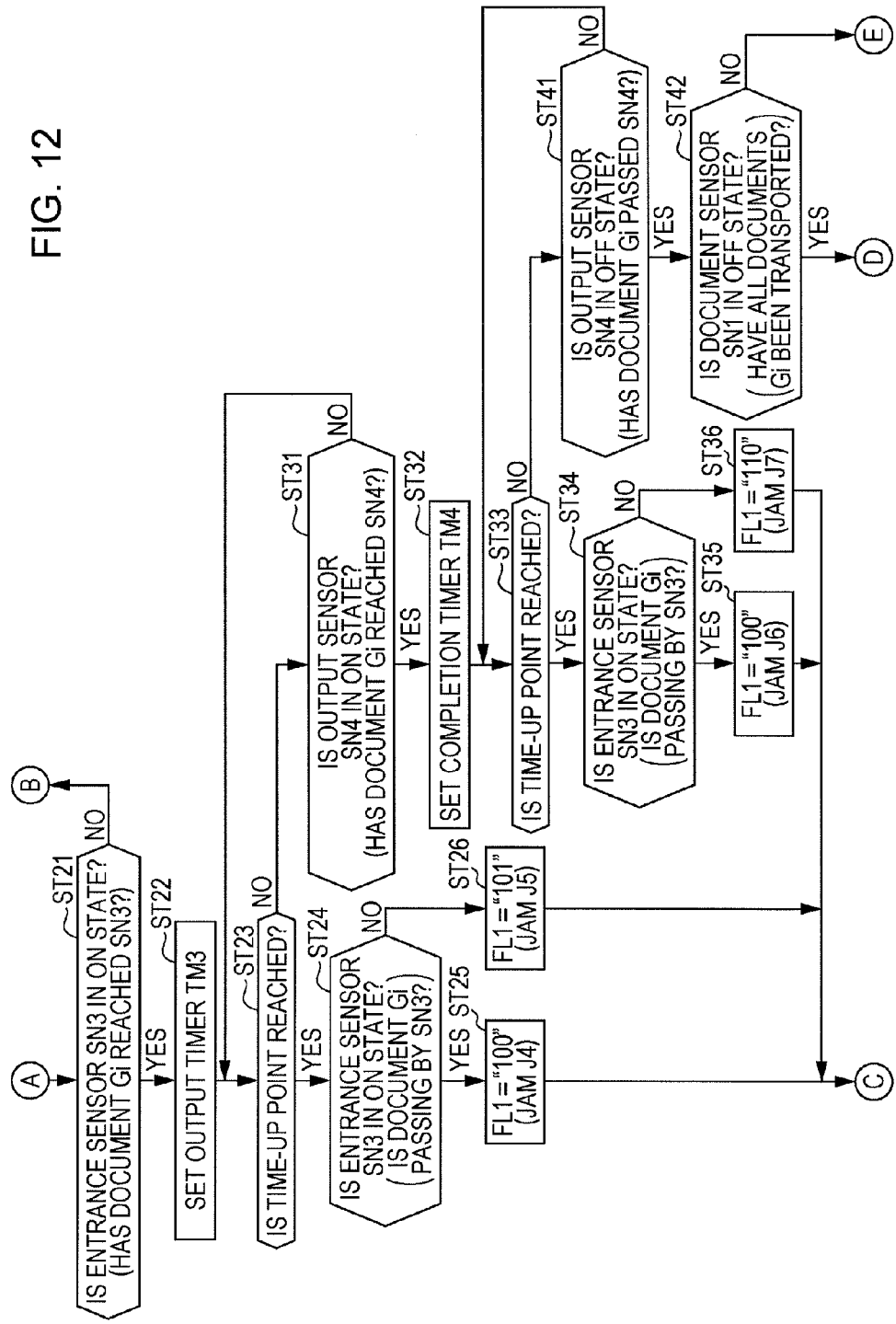
FIG. 12 is a flowchart of the jam detection process according to the first exemplary embodiment and continues from FIG. 11.

FIG. 12 is a flowchart of the jam detection process according to the first exemplary embodiment and continues from FIG. 11.

Steps ST in the flowcharts in FIGS. 11 and 12 are performed in accordance with a program stored in the controller C of the copier U. Furthermore, this process is executed concurrently with other various processes in the copier U.

The flowcharts shown in FIGS. 11 and 12 start when the power of the copier U is turned on.

In step ST1 in FIG. 11, it is determined whether or not the copy start button UIc is input. If yes (Y), the process proceeds to step ST2. If not (N), step ST1 is repeated.

In step ST2, it is determined whether or not the document sensor SN1 is in an on state, that is, whether or not there is a document Gi on the document feed tray TR1. If yes (Y), the process proceeds to step ST4. If not (N), the process proceeds to step ST3.

In step ST3, it is determined whether or not a manual reading operation is completed. If yes (Y), the process returns to step ST1. If not (N), step ST3 is repeated.

In step ST4, it is determined whether or not the nudging roller 37 is driven, that is, whether or not the document Gi is fed. If yes (Y), the process proceeds to step ST5. If not (N), step ST4 is repeated.

In step ST5, the registration timer TM1 is set. Then, the process proceeds to step ST6.

In step ST6, it is determined whether or not the registration timer TM1 has reached a time-up point. If yes (Y), the process proceeds to step ST7. If not (N), the process proceeds to step ST11.

In step ST7, the jam flag FL1 is set to "001". In other words, the occurrence of the jam J1 becomes identifiable. Then, the process proceeds to step ST8.

In step ST8, it is determined whether or not the jam flag FL1 is "000", that is, whether or not a jam removal process is completed. If yes (Y), the process returns to step ST1. If not (N), step ST8 is repeated.

In step ST11, it is determined whether or not the registration sensor SN2 is in an on state, that is, whether or not the leading edge of the document Gi has reached the registration sensor SN2. If yes (Y), the process proceeds to step ST12. If not (N), the process returns to step ST6.

In step ST12, the entrance timer TM2 is set. Then, the process proceeds to step ST13.

In step ST13, it is determined whether or not the entrance timer TM2 has reached a time-up point. If yes (Y), the process proceeds to step ST14. If not (N), the process proceeds to step ST21 in FIG. 12.

In step ST14, it is determined whether or not the registration sensor SN2 is in an on state, that is, whether or not the document Gi is in the course of passing by the registration sensor SN2. If yes (Y), the process proceeds to step ST15. If not (N), the process proceeds to step ST16.

In step ST15, the jam flag FL1 is set to "010". In other words, the occurrence of the jam J2 becomes identifiable. Then, the process proceeds to step ST8.

In step ST16, the jam flag FL1 is set to "011". In other words, the occurrence of the jam J3 becomes identifiable. Then, the process proceeds to step ST8.

In step ST21 in FIG. 12, it is determined whether or not the entrance sensor SN3 is in an on state, that is, whether or not the leading edge of the document Gi has reached the entrance sensor SN3. If yes (Y), the process proceeds to step ST22. If not (N), the process returns to step ST13 in FIG. 11.

In step ST22, the output timer TM3 is set. Then, the process proceeds to step ST23.

In step ST23, it is determined whether or not the output timer TM3 has reached a time-up point. If yes (Y), the process proceeds to step ST24. If not (N), the process proceeds to step ST31.

In step ST24, it is determined whether or not the entrance sensor SN3 is in an on state, that is, whether or not the document Gi is in the course of passing by the entrance sensor SN3. If yes (Y), the process proceeds to step ST25. If not (N), the process proceeds to step ST26.

In step ST25, the jam flag FL1 is set to "100". In other words, the occurrence of the jam j4 becomes identifiable. Then, the process proceeds to step ST8 in FIG. 11.

In step ST26, the jam flag FL1 is set to "101". In other words, the occurrence of the jam j5 becomes identifiable. Then, the process proceeds to step ST8 in FIG. 11.

In step ST31, it is determined whether or not the output sensor SN4 is in an on state, that is, whether or not the leading edge of the document Gi has reached the output sensor SN4. If yes (Y), the process proceeds to step ST32. If not (N), the process returns to step ST23.

In step ST32, the completion timer TM4 is set. Then, the process proceeds to step ST33.

In step ST33, it is determined whether or not the completion timer TM4 has reached a time-up point. If yes (Y), the process proceeds to step ST34. If not (N), the process proceeds to step ST41.

In step ST34, it is determined whether or not the entrance sensor SN3 is in an on state, that is, whether or not the document Gi is in the course of passing by the entrance sensor SN3. If yes (Y), the process proceeds to step ST35. If not (N), the process proceeds to step ST36.

In step ST35, the jam flag FL1 is set to "100". In other words, the occurrence of the jam J6 becomes identifiable. Then, the process proceeds to step ST8 in FIG. 11.

In step ST36, the jam flag FL1 is set to "110". In other words, the occurrence of the jam J7 becomes identifiable. Then, the process proceeds to step ST8 in FIG. 11.

In step ST41, it is determined whether or not the output sensor SN4 is in an off state, that is, whether or not the document Gi has passed the output sensor SN4. If yes (Y), the process proceeds to step ST42. If not (N), the process returns to step ST33.

In step ST42, it is determined whether or not the document sensor SN1 is in an off state, that is, whether or not all documents Gi on the document feed tray TR1 have been transported. If yes (Y), the process returns to step ST1 in FIG. 11. If not (N), the process returns to step ST4 in FIG. 11.

Flowchart of Jam-Removal Determination Process

Figure 13:
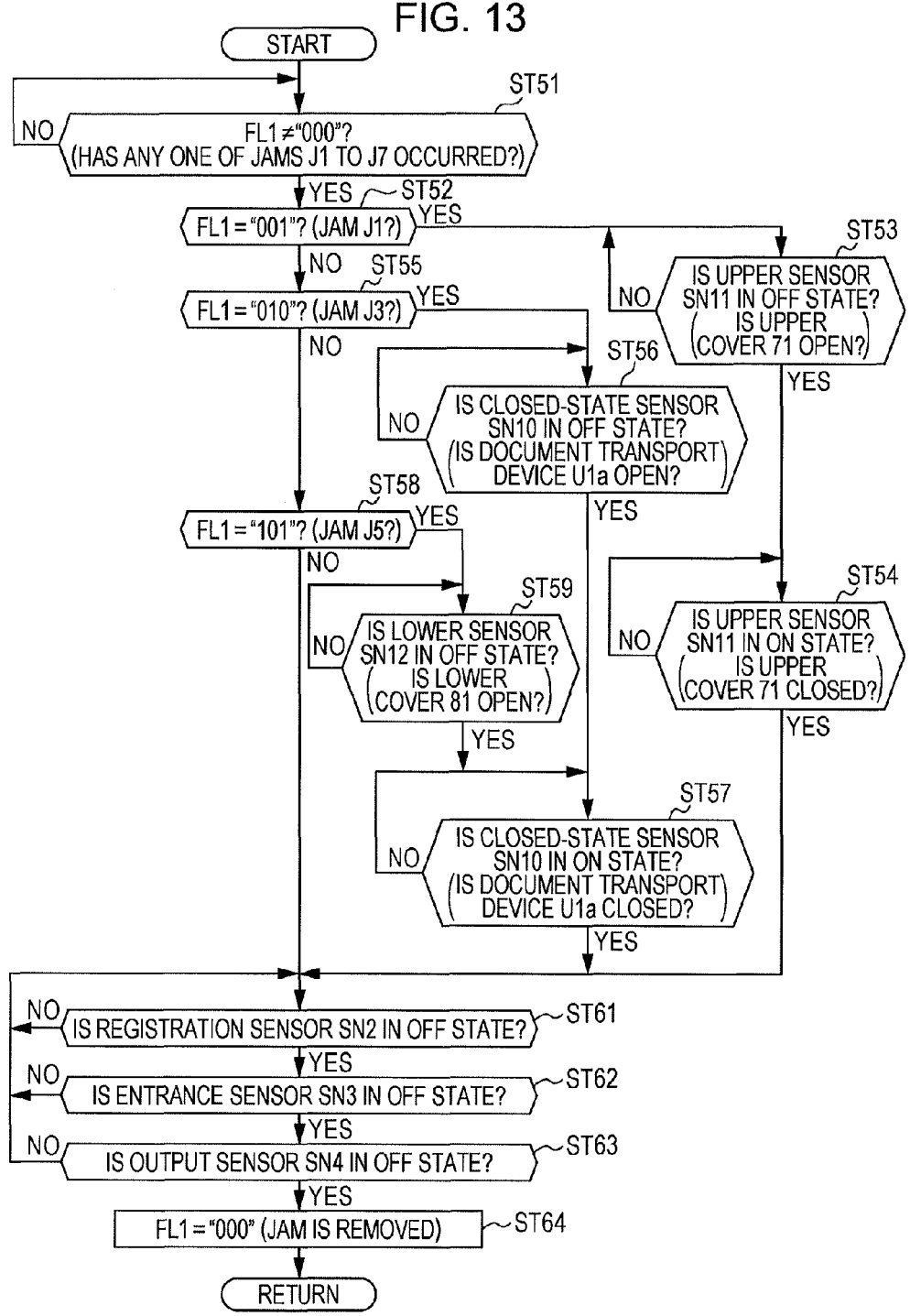
FIG. 13 is a flowchart of a jam-removal determination process according to the first exemplary embodiment.

FIG. 13 is a flowchart of a jam-removal determination process according to the first exemplary embodiment.

Steps ST in the flowchart in FIG. 13 are performed in accordance with a program stored in the controller C of the copier U. Furthermore, this process is executed concurrently with other various processes in the copier U.

The flowchart shown in FIG. 13 starts when the power of the copier U is turned on.

In step ST51 in FIG. 13, it is determined whether or not the jam flag FL1 is "000", that is, whether or not any one of the jams J1 to J7 has occurred. If yes (Y), the process proceeds to step ST52. If not (N), step ST51 is repeated.

In step ST52, it is determined whether or not the jam flag FL1 is "001". If yes (Y), the process proceeds to step ST53. If not (N), the process proceeds to step ST55.

In step ST53, it is determined whether or not the upper sensor SN11 is in an off state, that is, whether or not the upper cover 71 has been opened. If yes (Y), the process proceeds to step ST54. If not (N), step ST53 is repeated.

In step ST54, it is determined whether or not the upper sensor SN11 is in an on state, that is, whether or not the upper cover 71 has been closed. If yes (Y), the process proceeds to step ST61. If not (N), step ST54 is repeated.

In step ST55, it is determined whether or not the jam flag FL1 is "011". If yes (Y), the process proceeds to step ST56. If not (N), the process proceeds to step ST58.

In step ST56, it is determined whether or not the closed-state sensor SN10 is in an off state, that is, whether or not the document transport device U1a has been opened. If yes (Y), the process proceeds to step ST57. If not, step ST56 is repeated.

In step ST57, it is determined whether or not the closed-state sensor SN10 is in an on state, that is, whether or not the document transport device U1a has been closed. If yes (Y), the process proceeds to step ST61. If not (N), step ST57 is repeated.

In step ST58, it is determined whether or not the jam flag FL1 is "101". If yes (Y), the process proceeds to step ST59. If not (N), the process proceeds to step ST61.

In step ST59, it is determined whether or not the lower sensor SN12 is in an off state, that is, whether or not the lower cover 81 has been opened. If yes (Y), the process proceeds to step ST57. If not (N), step ST59 is repeated.

In step ST61, it is determined whether or not the registration sensor SN2 is in an off state. If yes (Y), the process proceeds to step ST62. If not (N), step ST61 is repeated.

In step ST62, it is determined whether or not the entrance sensor SN3 is in an off state. If yes (Y), the process proceeds to step ST63. If not (N), the process returns to step ST61.

In step ST63, it is determined whether or not the output sensor SN4 is in an off state. If yes (Y), the process proceeds to step ST64. If not (N), the process returns to step ST61.

In step ST64, the jam flag FL1 is set to "000". In other words, it is regarded that the jam has been removed. Then, the process returns to step ST51.

Flowchart of Cleaning Determination Process

Figure 14:
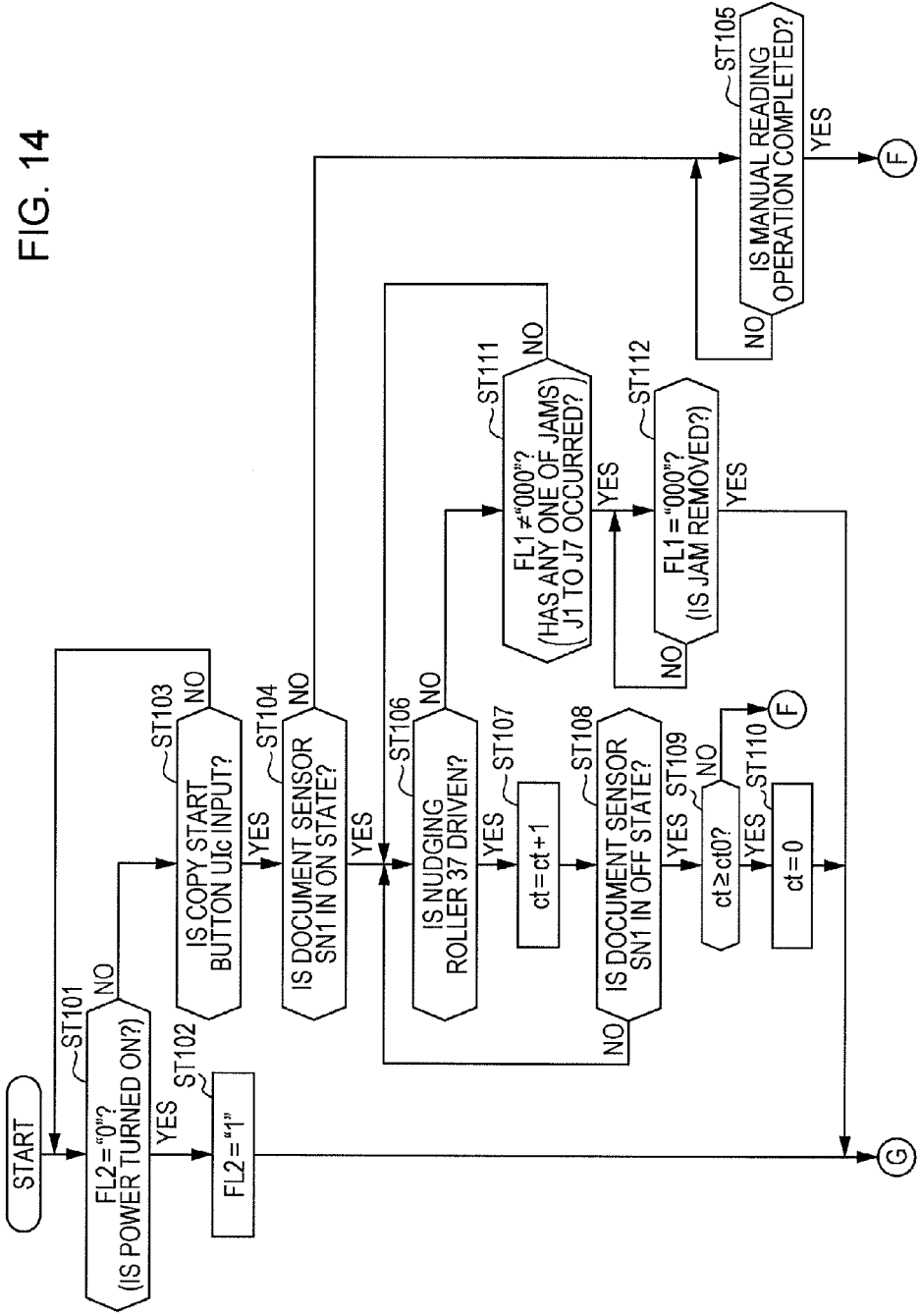
FIG. 14 is a flowchart of a cleaning determination process according to the first exemplary embodiment.

FIG. 14 is a flowchart of a cleaning determination process according to the first exemplary embodiment.

Figure 15:
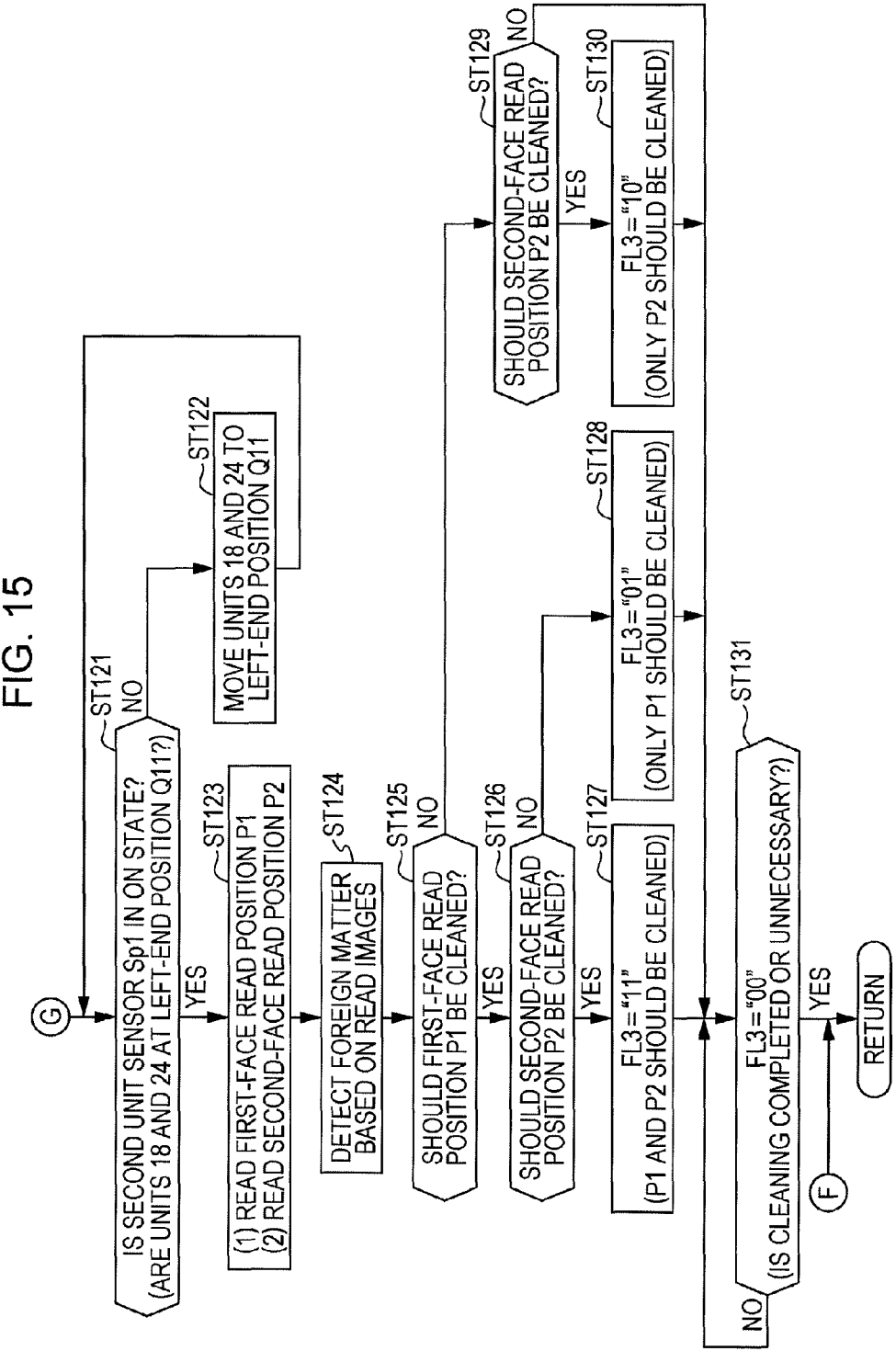
FIG. 15 is a flowchart of the cleaning determination process according to the first exemplary embodiment and continues from FIG. 14.

FIG. 15 is a flowchart of the cleaning determination process according to the first exemplary embodiment and continues from FIG. 14.

Steps ST in the flowcharts in FIGS. 14 and 15 are performed in accordance with a program stored in the controller C of the copier U. Furthermore, this process is executed concurrently with other various processes in the copier U.

The flowcharts shown in FIGS. 14 and 15 start when the power of the copier U is turned on.

In step ST101 in FIG. 14, it is determined whether or not the power-on flag FL2 is "0", that is, whether or not the power is turned on. If yes (Y), the process proceeds to step ST102. If not (N), the process proceeds to step ST103.

In step ST102, the power-on flag FL2 is set to "1". Then, the process proceeds to step ST121 in FIG. 15.

In step ST103, it is determined whether or not the copy start button UIc is input. If yes (Y), the process proceeds to step ST104. If not (N), the process returns to step ST101.

In step ST104, it is determined whether or not the document sensor SN1 is in an on state. If yes (Y), the process proceeds to step ST106. If not (N), the process proceeds to step ST105.

In step ST105, it is determined whether or not a manual reading operation is completed. If yes (Y), the process returns to step ST101. If not (N), step ST105 is repeated.

In step ST106, it is determined whether or not the nudging roller 37 is driven. If yes (Y), the process proceeds to step ST107. If not (N), the process proceeds to step ST111.

In step ST107, a value of 1 is added to the number ct of transported sheets. Then, the process proceeds to step ST108.

In step ST108, it is determined whether or not the document sensor SN1 is in an off state. If yes (Y), the process proceeds to step ST109. If not (N), the process returns to step ST106.

In step ST109, it is determined whether or not the number ct of transported sheets is larger than or equal to the threshold value ct0. If yes (Y), the process proceeds to step ST110. If not (N), the process returns to step ST101.

In step ST110, the number ct of transported sheets is set to 0. Then, the process proceeds to step ST121 in FIG. 15.

In step ST111, it is determined whether the jam flag FL1 is a value other than "000". If yes (Y), the process proceeds to step ST112. If not (N), the process returns to step ST106.

In step ST112, it is determined whether or not the jam flag FL1 is "000". If yes (Y), the process proceeds to step ST121 in FIG. 15. If not (N), step ST112 is repeated.

In step ST121 in FIG. 15, it is determined whether or not the second unit sensor Sp1 is in an on state, that is, whether or not the units 18 and 24 have moved to the left-end position Q11. If yes (Y), the process proceeds to step ST123. If not (N), the process proceeds to step ST122.

In step ST122, the units 18 and 24 are moved to the left-end position Q11. Then, the process returns to step ST121.

In step ST123, the following steps (1) and (2) are executed. Then, the process proceeds to step ST124.

(1) An image is read at the first-face read position P1 by using the solid-state imaging element CCD.

(2) An image is read at the second-face read position P2 by using the read sensor 61.

In step ST124, foreign-matter detection at the read positions P1 and P2 is performed based on the read images. Then, the process proceeds to step ST125.

In step ST125, it is determined whether or not the first-face read position P1 should be cleaned. If yes (Y), the process proceeds to step ST126. If not (N), the process proceeds to step ST129.

In step ST126, it is determined whether or not the second-face read position P2 should be cleaned. If yes (Y), the process proceeds to step ST127. If not (N), the process proceeds to step ST128.

In step ST127, the cleaning flag FL3 is set to "11". In other words, it becomes identifiable that both read positions P1 and P2 should be cleaned. Then, the process proceeds to step ST131.

In step ST128, the cleaning flag FL3 is set to "01". In other words, it becomes identifiable that the first-face read position P1 alone should be cleaned. Then, the process proceeds to step ST131.

In step ST129, it is determined whether or not the second-face read position P2 should be cleaned. If yes (Y), the process proceeds to step ST130. If not (N), the process proceeds to step ST131.

In step ST130, the cleaning flag FL3 is set to "10". In other words, it becomes identifiable that the second-face read position P2 alone should be cleaned. Then, the process proceeds to step ST131.

In step ST131, it is determined whether or not the cleaning flag FL3 is "00", that is, whether or not the cleaning is completed or is not necessary. If yes (Y), the process returns to step ST101 in FIG. 14. If not (N), step ST131 is repeated.

Flowchart of Notification Display Process

Figure 16:
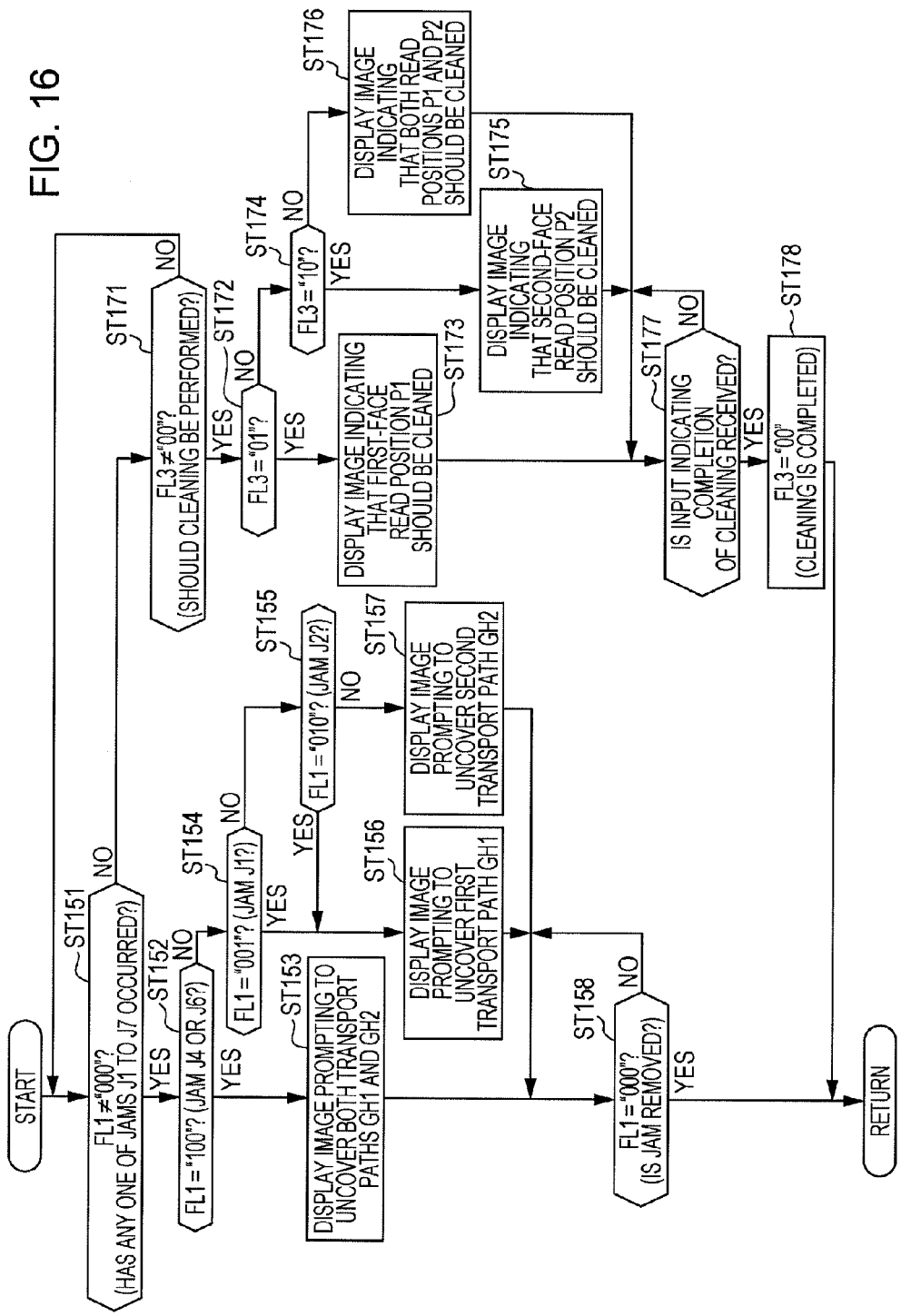
FIG. 16 is a flowchart of a notification display process according to the first exemplary embodiment.

FIG. 16 is a flowchart of a notification display process according to the first exemplary embodiment.

Steps ST in the flowchart in FIG. 16 are performed in accordance with a program stored in the controller C of the copier U. Furthermore, this process is executed concurrently with other various processes in the copier U.

The flowchart shown in FIG. 16 starts when the power of the copier U is turned on.

In step ST151 in FIG. 16, it is determined whether or not the jam flag FL1 is "000". If yes (Y), the process proceeds to step ST152. If not (N), the process proceeds to step ST171.

In step ST152, it is determined whether or not the jam flag FL1 is "100". If yes (Y), the process proceeds to step ST153. If not (N), the process proceeds to step ST154.

In step ST153, an image indicating that a document Gi is jammed astride the first transport path GH1 and the second transport path GH2 is displayed on the display UIb. Then, the process proceeds to step ST158.

In step ST154, it is determined whether or not the jam flag FL1 is "001". If yes (Y), the process proceeds to step ST156. If not (N), the process proceeds to step ST155.

In step ST155, it is determined whether or not the jam flag FL1 is "010". If yes (Y), the process proceeds to step ST156. If not (N), the process proceeds to step ST157.

In step ST156, an image prompting the user to uncover the first transport path GH1 is displayed on the display UIb. Then, the process proceeds to step ST158.

In step ST157, an image prompting the user to uncover the second transport path GH2 is displayed on the display UIb. Then, the process proceeds to step ST158.

In step ST158, it is determined whether or not the jam flag FL1 is "000". If yes (Y), the process returns to step ST151. If not (N), step ST158 is repeated.

In step ST171, it is determined whether or not the cleaning flag FL3 is "00", that is, whether or not cleaning should be performed. If yes (Y), the process proceeds to step ST172. If not (N), the process returns to step ST151.

In step ST172, it is determined whether or not the cleaning flag FL3 is "01". If yes (Y), the process proceeds to step ST173. If not (N), the process proceeds to step ST174.

In step ST173, an image indicating that the first-face read position P1 should be cleaned is displayed on the display UIb. Then, the process proceeds to step ST177.

In step ST174, it is determined whether or not the cleaning flag FL3 is "10". If yes (Y), the process proceeds to step ST175. If not (N), the process proceeds to step ST176.

In step ST175, an image indicating that the second-face read position P2 should be cleaned is displayed on the display UIb. Then, the process proceeds to step ST177.

In step ST176, an image indicating that both of the first-face read position P1 and the second-face read position P2 should be cleaned is displayed on the display UIb. Then, the process proceeds to step ST177.

In step ST177, it is determined whether or not an input indicating that the cleaning is completed is received. If yes (Y), the process proceeds to step ST178. If not (N), step ST177 is repeated.

In step ST178, the cleaning flag FL3 is set to "00". In other words, it becomes identifiable that the cleaning is completed. Then, the process returns to step ST151.

Flowchart of First-Light-Source Control Process when Jam Occurs

Figure 17:
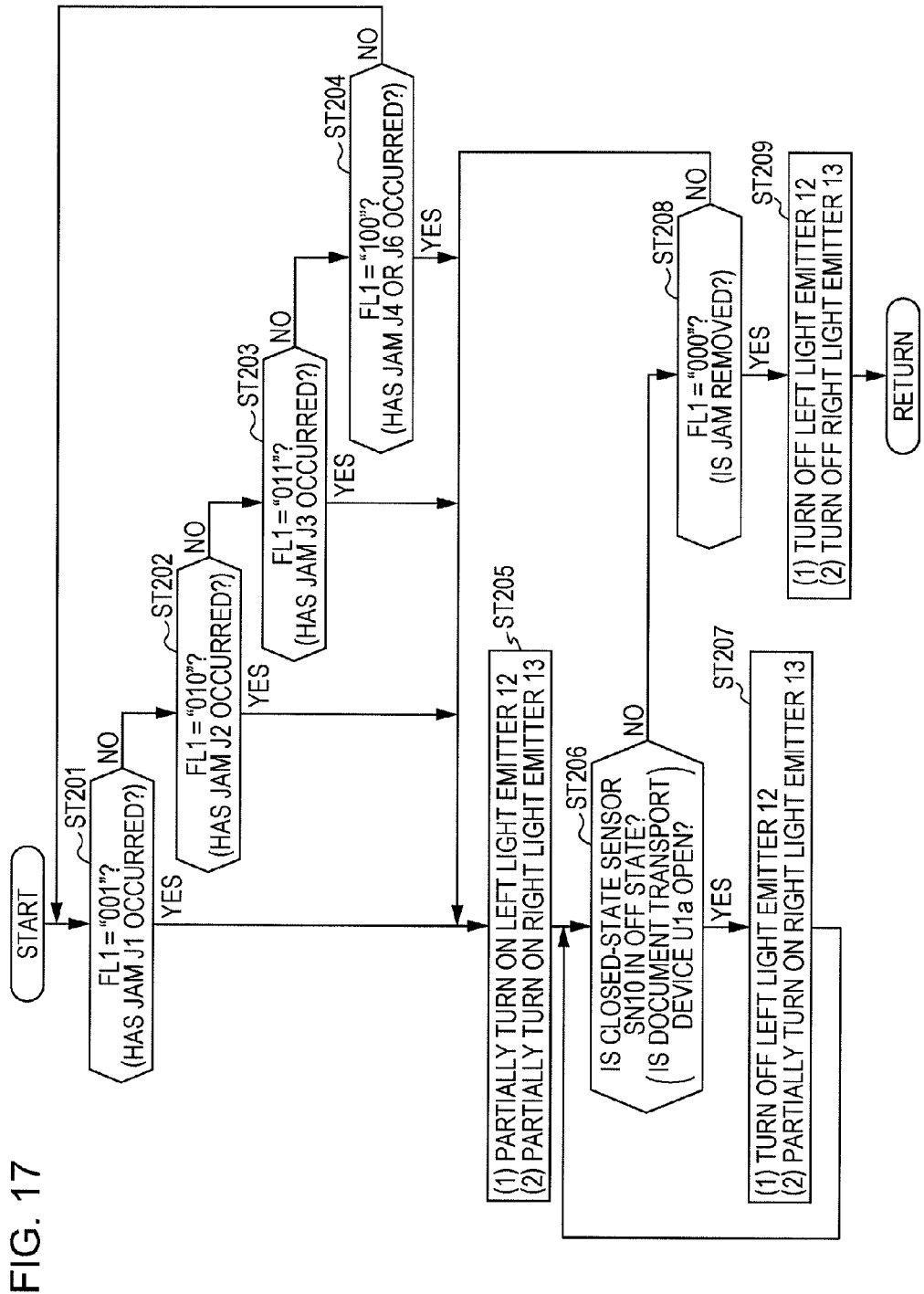
FIG. 17 is a flowchart of a first-light-source control process according to the first exemplary embodiment when a jam occurs.

FIG. 17 is a flowchart of a first-light-source control process according to the first exemplary embodiment when a jam occurs.

Steps ST in the flowchart in FIG. 17 are performed in accordance with a program stored in the controller C of the copier U. Furthermore, this process is executed concurrently with other various processes in the copier U.

The flowchart shown in FIG. 17 starts when the power of the copier U is turned on.

In step ST201 in FIG. 17, it is determined whether or not the jam flag FL1 is "001". If yes (Y), the process proceeds to step ST205. If not (N), the process proceeds to step ST202.

In step ST202, it is determined whether or not the jam flag FL1 is "010". If yes (Y), the process proceeds to step ST205. If not (N), the process proceeds to step ST203.

In step ST203, it is determined whether or not the jam flag FL1 is "011". If yes (Y), the process proceeds to step ST205. If not (N), the process proceeds to step ST204.

In step ST204, it is determined whether or not the jam flag FL1 is "100". If yes (Y), the process proceeds to step ST205. If not (N), the process returns to step ST201.

In step ST205, the following steps (1) and (2) are executed. Then, the process proceeds to step ST206.
(1) The left light emitter 12 is partially turned on.
(2) The right light emitter 13 is partially turned on.

In step ST206, it is determined whether or not the closed-state sensor SN10 is in an off state. If yes (Y), the process proceeds to step ST207. If not (N), the process proceeds to step ST208.

In step ST207, the following steps (1) and (2) are executed. Then, the process returns to step ST206.
(1) The left light emitter 12 is turned off.
(2) The right light emitter 13 is partially turned on.

In step ST208, it is determined whether or not the jam flag FL1 is "000". If yes (Y), the process proceeds to step ST209. If not (N), the process returns to step ST205.

In step ST209, the following steps (1) and (2) are executed. Then, the process returns to step ST201.
(1) The left light emitter 12 is turned off.
(2) The right light emitter 13 is turned off.

Flowchart of Second-Light-Source Control Process when Jam Occurs

Figure 18:
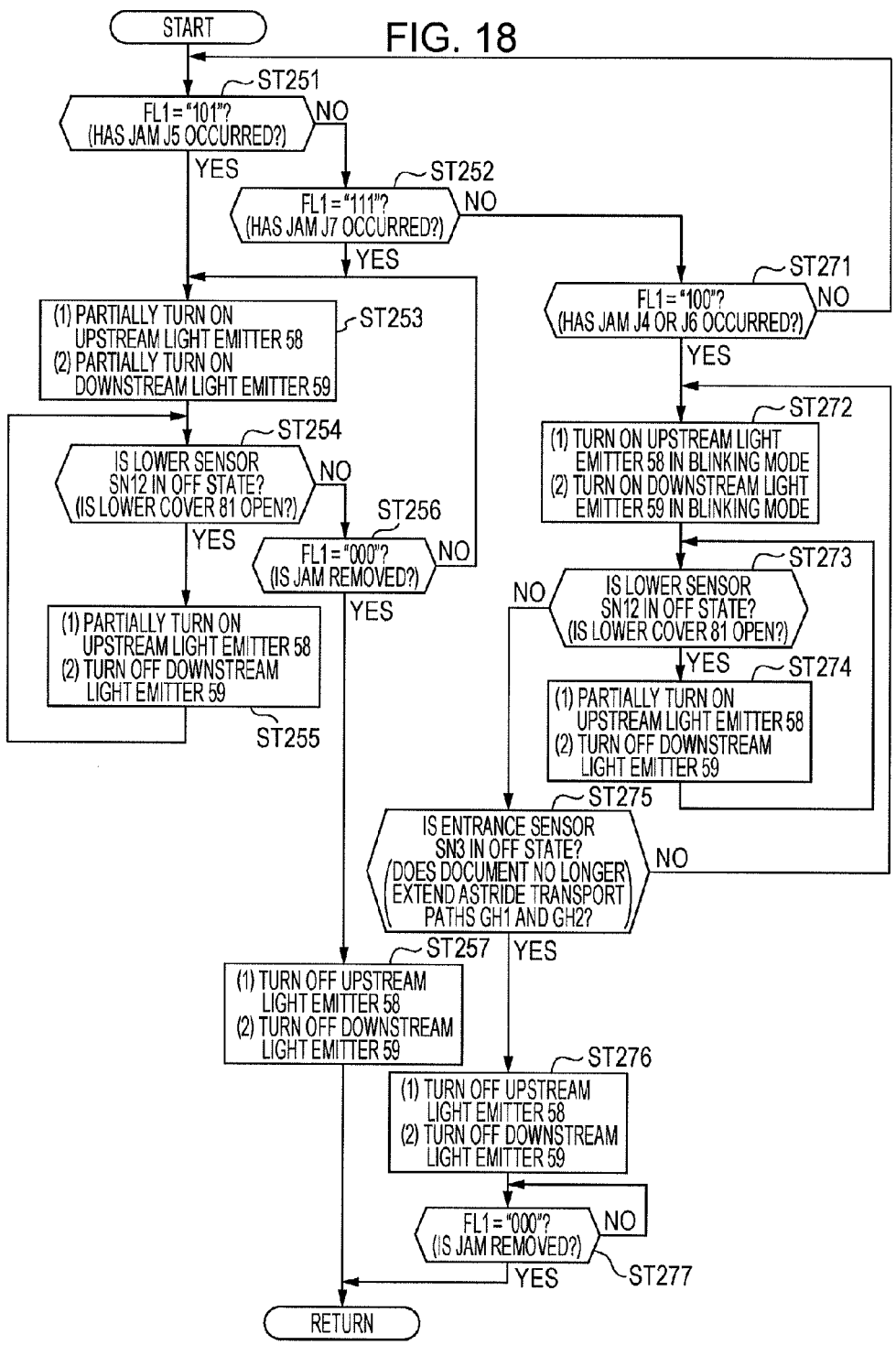
FIG. 18 illustrates a flowchart of a second-light-source control process according to the first exemplary embodiment when a jam occurs.

FIG. 18 illustrates a flowchart of a second-light-source control process according to the first exemplary embodiment when a jam occurs.

Steps ST in the flowchart in FIG. 18 are performed in accordance with a program stored in the controller C of the copier U. Furthermore, this process is executed concurrently with other various processes in the copier U.

The flowchart shown in FIG. 18 starts when the power of the copier U is turned on.

In step ST251 in FIG. 18, it is determined whether or not the jam flag FL1 is "101". If yes (Y), the process proceeds to step ST253. If not (N), the process proceeds to step ST252.

In step ST252, it is determined whether or not the jam flag FL1 is "110". If yes (Y), the process proceeds to step ST253. If not (N), the process proceeds to step ST271.

In step ST253, the following steps (1) and (2) are executed. Then, the process proceeds to step ST254.
(1) The upstream light emitter 58 is partially turned on.
(2) The downstream light emitter 59 is partially turned on.

In step ST254, it is determined whether or not the lower sensor SN12 is in an off state. If yes (Y), the process proceeds to step ST255. If not (N), the process proceeds to step ST256.

In step ST255, the following steps (1) and (2) are executed. Then, the process returns to step ST254.
(1) The upstream light emitter 58 is partially turned on.
(2) The downstream light emitter 59 is turned off.

In step ST256, it is determined whether or not the jam flag FL1 is "000". If yes (Y), the process proceeds to step ST257. If not (N), the process returns to step ST253.

In step ST257, the following steps (1) and (2) are executed. Then, the process returns to step ST251.
(1) The upstream light emitter 58 is turned off.
(2) The downstream light emitter 59 is turned off.

In step ST271, it is determined whether or not the jam flag FL1 is "100". If yes (Y), the process proceeds to step ST272. If not (N), the process returns to step ST251.

In step ST272, the following steps (1) and (2) are executed. Then, the process proceeds to step ST273.
(1) The upstream light emitter 58 is turned on in a blinking mode.
(2) The downstream light emitter 59 is turned on in a blinking mode.

In step ST273, it is determined whether or not the lower sensor SN12 is in an off state. If yes (Y), the process proceeds to step ST274. If not (N), the process proceeds to step ST275.

In step ST274, the following steps (1) and (2) are executed. Then, the process returns to step ST273.
(1) The upstream light emitter 58 is partially turned on.
(2) The downstream light emitter 59 is turned off.

In step ST275, it is determined whether or not the entrance sensor SN3 is in an off state, that is, whether or not the document Gi no longer extends astride the first transport path GH1 and the second transport path GH2. If yes (Y), the process proceeds to step ST276. If not (N), the process returns to step ST272.

In step ST276, the following steps (1) and (2) are executed. Then, the process proceeds to step ST277.
(1) The upstream light emitter 58 is turned off.
(2) The downstream light emitter 59 is turned off.

In step ST277, it is determined whether or not the jam flag FL1 is "000". If yes (Y), the process returns to step ST251. If not (N), step ST277 is repeated.

Flowchart of First-Light-Source Control Process when Performing Cleaning

Figure 19:
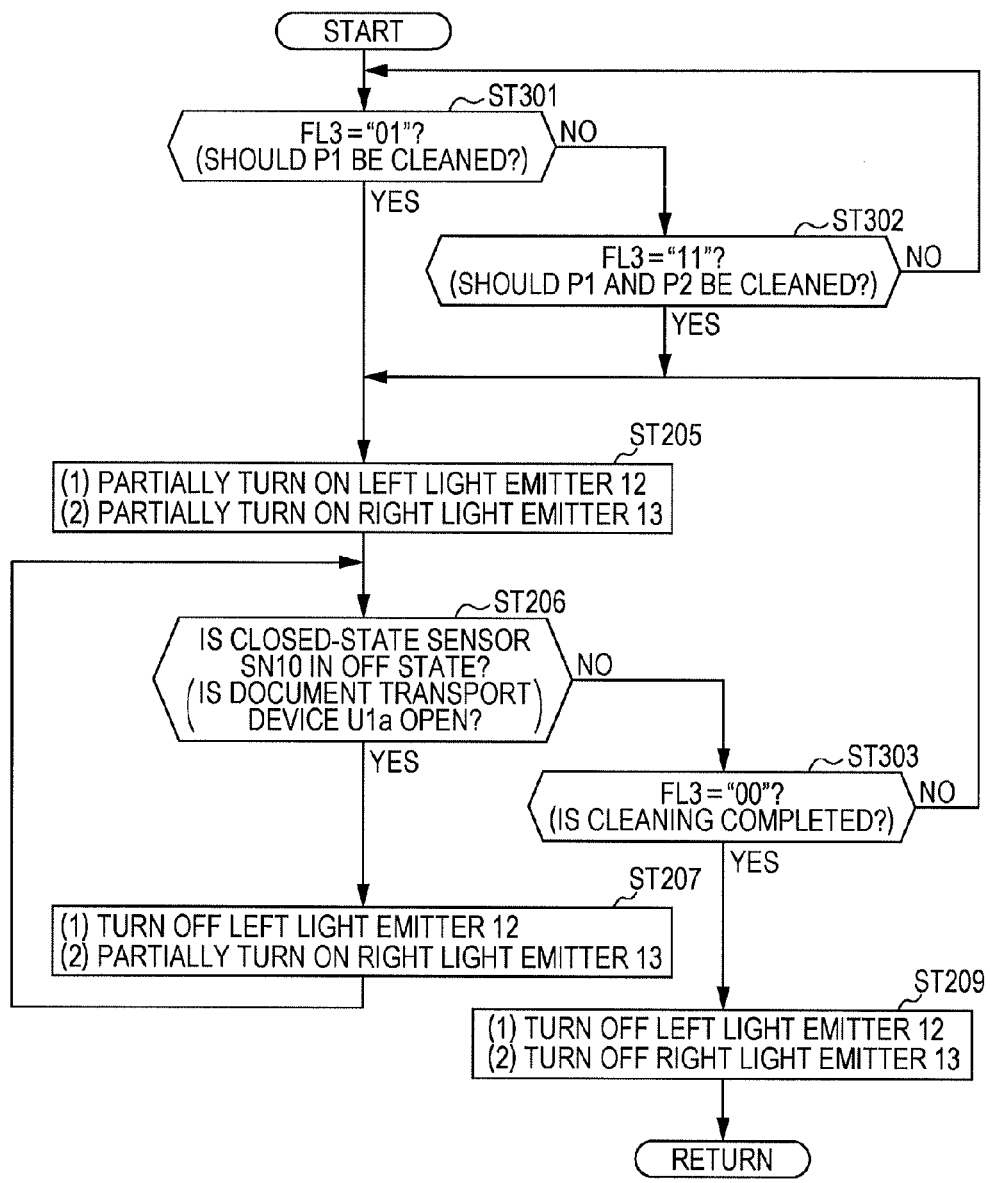
FIG. 19 is a flowchart of a first-light-source control process according to the first exemplary embodiment when performing cleaning.

FIG. 19 is a flowchart of a first-light-source control process according to the first exemplary embodiment when performing cleaning.

Steps ST in the flowchart in FIG. 19 are performed in accordance with a program stored in the controller C of the copier U. Furthermore, this process is executed concurrently with other various processes in the copier U.

The flowchart shown in FIG. 19 starts when the power of the copier U is turned on.

In the first-light-source control process for cleaning, steps ST301 and ST302 are executed in place of steps ST201 to ST204 in the first-light-source control process performed when a jam occurs. Furthermore, in the first-light-source control process for cleaning, step ST303 is executed in place of step ST208 in the first-light-source control process performed when a jam occurs. Since steps ST205 to ST207 and step ST209 other than steps ST301 to ST303 are the same as those in the first-light-source control process performed when a jam occurs, only steps ST301 to ST303 will be described below.

In step ST301 in FIG. 19, it is determined whether or not the cleaning flag FL3 is "01". If yes (Y), the process proceeds to step ST205. If not (N), the process proceeds to step ST302.

In step ST302, it is determined whether or not the cleaning flag FL3 is "11". If yes (Y), the process proceeds to step ST205. If not (N), the process returns to step ST301.

In step ST303, it is determined whether or not the cleaning flag FL3 is "00". If yes (Y), the process proceeds to step ST209. If not (N), the process returns to step ST205.

Flowchart of Second-Light-Source Control Process when Performing Cleaning

Figure 20:
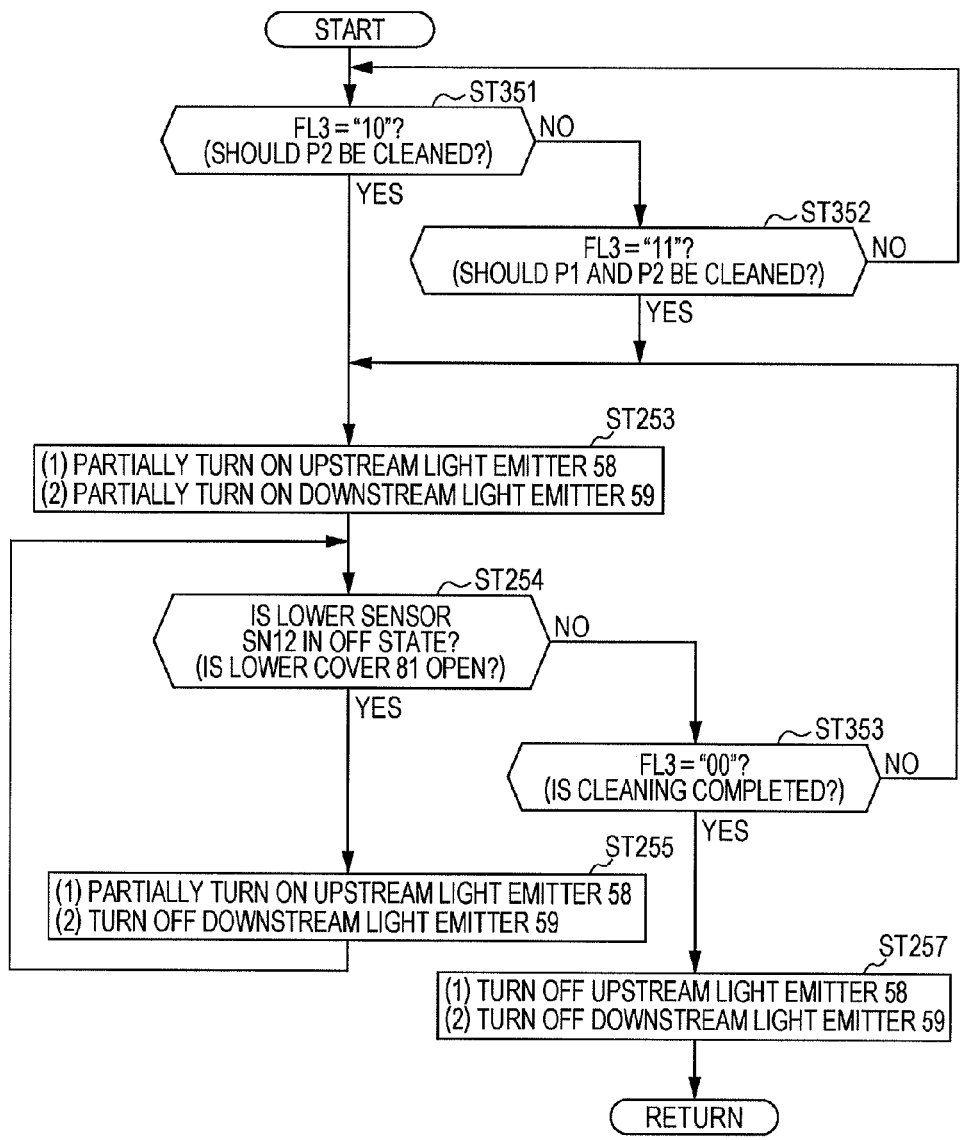
FIG. 20 is a flowchart of a second-light-source control process according to the first exemplary embodiment when performing cleaning.

FIG. 20 is a flowchart of a second-light-source control process according to the first exemplary embodiment when performing cleaning.

Steps ST in the flowchart in FIG. 20 are performed in accordance with a program stored in the controller C of the copier U. Furthermore, this process is executed concurrently with other various processes in the copier U.

The flowchart shown in FIG. 20 starts when the power of the copier U is turned on.

In the second-light-source control process for cleaning, steps ST351 and ST352 are executed in place of steps ST251 and ST252 in the second-light-source control process performed when a jam occurs. Furthermore, in the second-light-source control process for cleaning, step ST353 is executed in place of step ST256 in the second-light-source control process performed when a jam occurs. Moreover, in the second-light-source control process for cleaning, steps ST271 to ST279 in the second-light-source control process performed when a jam occurs have been omitted. Since steps ST253 to ST255 and step ST257 other, than steps ST351 to ST353 are the same as those in the second-light-source control process performed when a jam occurs, only steps ST351 to ST353 will be described below.

In step ST351 in FIG. 20, it is determined whether or not the cleaning flag FL3 is "10". If yes (Y), the process proceeds to step ST253. If not (N), the process proceeds to step ST352.

In step ST352, it is determined whether or not the cleaning flag FL3 is "11". If yes (Y), the process proceeds to step ST253. If not (N), the process returns to step ST351.

In step ST353, it is determined whether or not the cleaning flag FL3 is "00". If yes (Y), the process proceeds to step ST257. If not (N), the process returns to step ST253.

Specific Functions of Scanner Body U1b and Document Transport Device U1a

In the copier U according to the first exemplary embodiment having the above-described configuration, when the copy start button UIc is input in a state where documents Gi are stacked on the document feed tray U1a1, the automatic reading operation is executed. Specifically, each of the documents Gi stacked on the document feed tray U1a1 is fed and transported to the document transport path GH. With regard to each document Gi transported along the document transport path GH, the first face and the second face of the document Gi are irradiated with light from the light emitters 12 to 59 of the light sources L1 and L2 at the read positions P1 and P2. Reflected light beams from the first face and the second face are respectively received by the solid-state imaging element CCD and the read sensor 61. Thus, images are automatically read from the document Gi. In a case where the images are to be automatically read by transporting the document Gi along the document transport path GH, a so-called jam in which the document Gi becomes jammed in the transport path may sometimes occur. When a jam is detected in the copier U according to the first exemplary embodiment, the user is notified of the occurrence of the jam based on the conditions in which the jam has occurred.

Figure 21A:
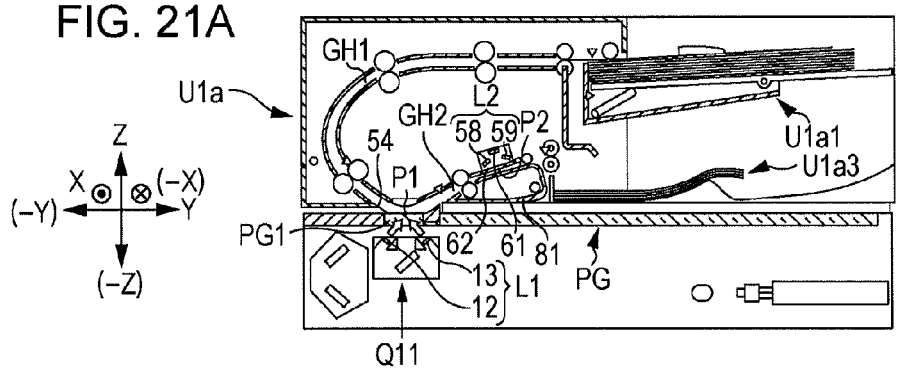
FIGS. 21A to 21C illustrate the operation according to the first exemplary embodiment, FIG. 21A illustrating a state where the document transport device is located at a readable position and a read base is closed, FIG. 21B illustrating a state where the document transport device is located at the readable position and the upper cover is open, FIG. 21C illustrating a state where the document transport device has moved to a working position and the read base is open.
Figure 21B:
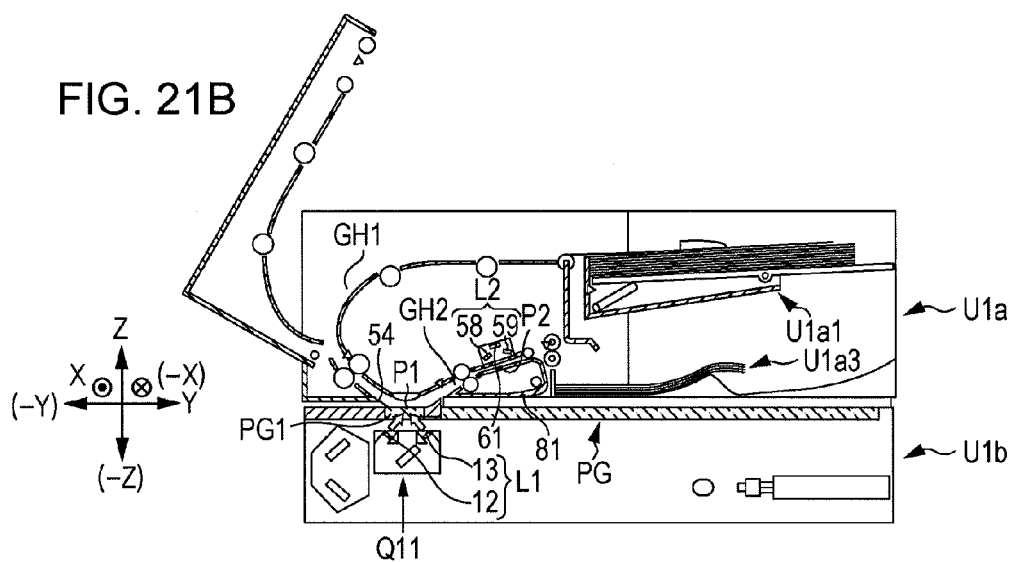
Figure 21C:
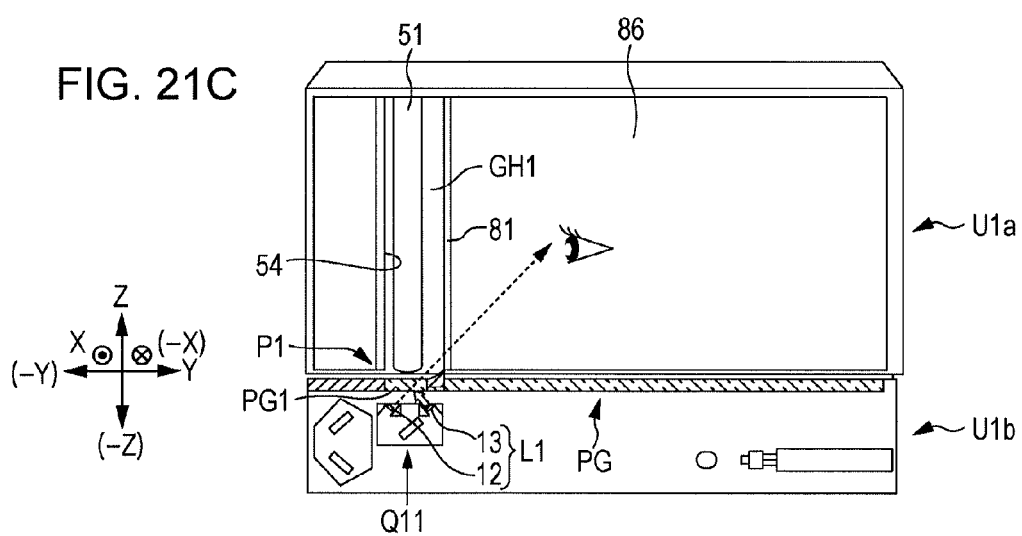

FIGS. 21A to 21C illustrate the operation according to the first exemplary embodiment. Specifically, FIG. 21A illustrates a state where the document transport device U1a is located at the readable position and the document base PG is covered, FIG. 21B illustrates a state where the document transport device U1a is located at the readable position and the upper cover 71 is open, and FIG. 21C illustrates a state where the document transport device U1a has moved to the working position and the document base PG is uncovered.

In the first exemplary embodiment, when one of the jams J1 and J2 is detected within the first transport path GH1, the image shown in FIG. 9A that prompts the user to open the upper cover 71 is displayed on the display UIb. In this case, in the light source unit 18 located at the left-end position Q11, the light emitters 12 and 13 of the first light source L1 are partially turned on, that is, they are turned on in accordance with a light intensity lower than that when a reading operation is performed. Thus, as shown in FIG. 21A, when the document transport device U1a is located at the readable position, light radiated from the first light source L1 enters the first transport path GH1 from the read window PG1 at the first-face read position P1 via the opening 54.

Therefore, the interior of the first transport path GH1 is illuminated and becomes brighter. Thus, when the user opens the upper cover 71 and tries to remove the document Gi, the document Gi jammed within the first transport path GH1 is illuminated and becomes readily recognizable. Specifically, in the first exemplary embodiment, the document Gi is readily removable while recognizing, for example, the position and the orientation thereof, as compared with a case where the document Gi is to be removed in a state where the first light source L1 is not turned on and the first transport path GH1 remains to be dark. Consequently, the possibility of the jammed document being torn as a result of being forcedly pulled out or the possibility of pieces of the torn document remaining in the transport path may be reduced.

Furthermore, in the first exemplary embodiment, when one of the jams J1 and J2 occurs and the light emitters 12 and 13 of the first light source L1 are to be turned on, the first light source L1 is partially turned on in accordance with a light intensity lower than that when performing a reading operation. If the first light source L1 is turned on in accordance with a light intensity equal to the light intensity used when performing a reading operation, there is a possibility that the first light source L1 may be too bright. Thus, in the first exemplary embodiment, the first light source L1 is turned on in accordance with a light intensity lower than that when performing a reading operation so that the first transport path GH1 is illuminated in a state where brightness is reduced, thereby facilitating the removal of the document Gi.

In the first exemplary embodiment, when the upper cover 71 is opened and is subsequently closed, if a document is not detected by the sensors SN2 to SN4, it is detected that the jam J1 or J2 has been removed.

When the jam J1 or J2 occurs, there is a case where the document transport device U1a is opened without opening the upper cover 71, regardless of the displayed contents on the display UIb. In other words, there is a case where the document base PG is exposed to the outside in a state where the jam J1 or J2 is not removed. In this case, in the first exemplary embodiment, the left light emitter 12 of the first light source L1 is turned off and the right light emitter 13 is maintained in a partially on state. Thus, in the document base PG exposed to the outside, the read window PG1 is illuminated and becomes brighter. Moreover, light enters the first transport path GH1 from the read window PG1 via the opening 54. As a result, the document Gi jammed near the opening 54 becomes visually recognizable, as compared with a case where the first light source L1 is turned off.

In particular, in the first exemplary embodiment, only the right light emitter 13 alone of the first light source L1 is turned on, whereas the left light emitter 12 is turned off. Therefore, in FIG. 21C, although light is radiated away from the center of the document base PG in the left-right direction, light is not radiated toward the center of the document base PG in the left-right direction. With regard to the copier U according to the first exemplary embodiment, the user often stands at the center of the copier U in the left-right direction and, for example, opens the document transport device U1a and checks the document Gi. In this case, if the left light emitter 12 is turned on, the light from the left light emitter 12 tends to directly enter the user's eyes. This light may be too bright for the user and may possibly make it difficult for the user to execute operation. In contrast, in the first exemplary embodiment in which the left light emitter 12 is turned off, the light emitted from the first light source L1 is less likely to directly enter the user's eyes. Therefore, even in the configuration in which the first light source L1 is turned on when the document base PG is uncovered, the brightness sensed by the user is reduced in the first exemplary embodiment. The overall light intensity of the first light source L1 is lower than when each of the light emitters 12 and 13 is partially turned on. Thus, the brightness may be further reduced.

In the first exemplary embodiment, when the jam J3 is detected within the first transport path GH1, the first light source L1 is controlled in a manner similar to the case of the jams J1 and J2. On the other hand, the display UIb displays the image shown in FIG. 9B that prompts the user to open the lower cover 81. Thus, in a case where the jam J3 occurs, if the document transport device U1a is opened as a result of the user trying to open the lower cover 81, the first light source L1 is turned on, so that the document Gi within the first transport path GH1 becomes readily illuminated through the opening 54. Therefore, the document Gi within the first transport path GH1 becomes readily recognized by the user who has opened the document transport device U1a. Consequently, the document Gi at the jam J3 may be readily removed through, for example, the opening 54.

Figure 22A:
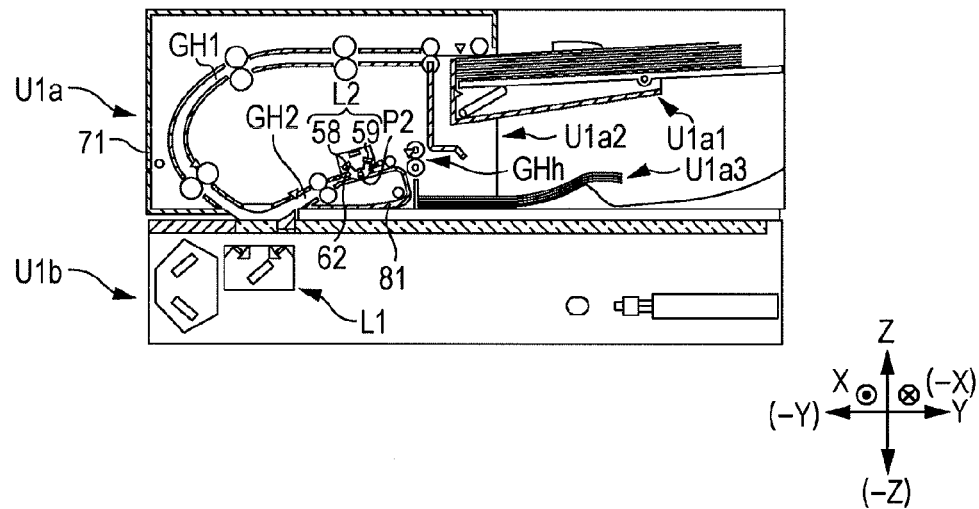
FIGS. 22A and 22B illustrate the operation according to the first exemplary embodiment, FIG. 22A illustrating a state where the document transport device is located at the readable position and the lower cover is located at a closed position, FIG. 22B illustrating a state where the document transport device is located at the working position and the lower cover is located at the open position.
Figure 22B:
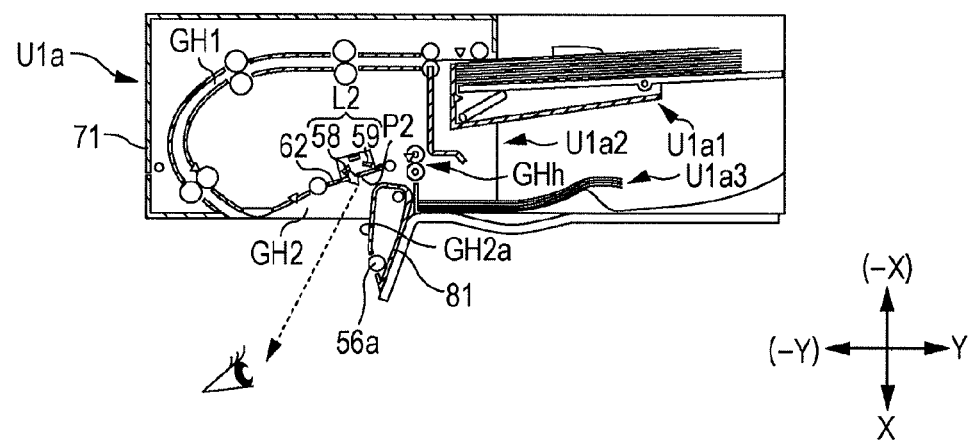

FIGS. 22A and 22B illustrate the operation according to the first exemplary embodiment. Specifically, FIG. 22A illustrates a state where the document transport device U1a is located at the readable position and the lower cover 81 is located at the closed position, and FIG. 22B illustrates a state where the document transport device U1a is located at the working position and the lower cover 81 is located at the open position.

In the first exemplary embodiment, when one of the jams J5 and J7 is detected within the second transport path GH2, the image shown in FIG. 9B that prompts the user to open the lower cover 81 is displayed on the display UIb. In this case, as shown in FIG. 22A, the light emitters 58 and 59 of the second light source L2 are partially turned on. Thus, the interior of the second transport path GH2 is illuminated and becomes brighter. In this case, light tends to leak outside, for example, through the gap between the lower cover 81 and the document transport device U1a and also through an output port GHh of the second transport path GH2. Therefore, as compared with a case where a notification is simply provided on the display UIb, the user may readily recognize that the document Gi is jammed in the second transport path GH2.

In the document transport device U1a according to the first exemplary embodiment, the output port GHh of the second transport path GH2 is disposed between the document feed tray U1a1 and the document output tray U1a3 and is thus disposed in a deep narrow area. Therefore, it is difficult to remove the document Gi through the output port GHh of the second transport path GH2. Thus, in the first exemplary embodiment, when the document Gi in the second transport path GH2 is to be removed, the second transport path GH2 is often uncovered by opening the lower cover 81. Referring to FIGS. 21A to 21C and FIG. 22B, in the first exemplary embodiment, when the document transport device U1a is opened and the lower cover 81 is opened, the light intensity of the second light source L2 is set to be lower than the light intensity used when performing a reading operation. Therefore, when the lower cover 81 is opened, the interior of the second transport path GH2 is illuminated with reduced brightness.

In particular, in the second light source L2 according to the first exemplary embodiment, only the upstream light emitter 58 is partially turned on, whereas the downstream light emitter 59 is turned off. Therefore, in FIG. 22B, although light is radiated away from the area where the lower cover 81 opens, light is less likely to be radiated toward the area where the lower cover 81 opens. Consequently, the light emitted from the second light source L2 is less likely to directly enter the eyes of the user viewing through the area where the lower cover 81 opens. Thus, in the first exemplary embodiment, when the document Gi within the second transport path GH2 is to be removed, the interior of the second transport path GH2 is illuminated with reduced brightness, thereby enhancing workability similarly to when removing the document Gi from the first transport path GH1.

In the first exemplary embodiment, when the lower cover 81 is opened and the document transport device U1a is subsequently closed, if a document is not detected by the sensors SN2 to SN4, it is detected that the jam J5 or J7 has been removed.

FIGS. 23A to 23C illustrate the operation according to the first exemplary embodiment. Specifically, FIG. 23A illustrates an example where a document Gi is jammed astride the first transport path GH1 and the second transport path GH2, FIG. 23B illustrates a case where the document in the second transport path GH2 is removed from the state in FIG. 23A, and FIG. 23C illustrates a comparison in a case where the upper cover 71 is opened from the state in FIG. 23A.

As shown in FIG. 23A, in the first exemplary embodiment, when one of the jams j4 and J6 located astride the first transport path GH1 and the second transport path GH2 is detected, the image shown in FIG. 9C that prompts the user to open the upper cover 71 and the lower cover 81 is displayed on the display UIb. In this case, in the light source unit 18 located at the left-end position Q11, the light emitters 12 and 13 of the first light source L1 are partially turned on. Thus, the interior of the first transport path GH1 is illuminated via the opening 54. In the second light source L2, the light emitters 58 and 59 start to blink. Thus, the interior of the second transport path GH2 is illuminated with blinking light. Therefore, the blinking light tends to leak from, for example, the output port GHh so that the second transport path GH2 becomes conspicuous. Consequently, the user's attention may be readily drawn toward the second transport path GH2, as compared with a case where the second light source L2 emits non-blinking stable light. Specifically, when the jam J4 or J6 is detected, the user's attention may be readily drawn to the second transport path GH2 from which the document Gi should be removed by priority relative to the first transport path GH1.

In the first exemplary embodiment, when the second transport path GH2 is to be uncovered, the document transport device U1a is first opened. When the document transport device U1a is opened, the right light emitter 13 in the first light source L1 is maintained in a partially on state, whereas the left light emitter 12 is turned off. Thus, the light from the first light source L1 illuminating the first transport path GH1 is less likely to directly enter the eyes of the user performing operation by opening the document transport device U1a. When the second transport path GH2 is uncovered by opening the lower cover 81, the upstream light emitter 58 in the second light source L2 is switched from a blinking made to a partially on state, and the downstream light emitter 59 is switched from a blinking mode to an off state. Thus, the interior of the second transport path GH2 is illuminated with non-blinking stable light. Consequently, the user is less likely to be irritated by blinking light, as compared with a case where the interior of the second transport path GH2 is illuminated with blinking light. In addition, the viewability of the document Gi within the second transport path GH2 may be improved. In this case, the downstream light emitter 59 is turned off, as in the case of the jams J5 and J7, so that light is not radiated from the second light source L2 toward the lower cover 81.

As shown in FIG. 23B, when the document Gi is removed from the second transport path GH2 and the entrance sensor SN3 switches to an off state, the second light source L2 is turned off in the first exemplary embodiment. Thus, the interior of the second transport path GH2 becomes dark. Therefore, the user may readily recognize that the removal of the document Gi from the second transport path GH2 has been completed. This increases the possibility in which the user closes the lower cover 81.

In the first exemplary embodiment, if the document Gi within the second transport path GH2 is not removed and the lower cover 81 is closed while the entrance sensor SN3 remains in an on state, the blinking mode of the second light source L2 is resumed. Thus, the blinking light leaks from the second transport path GH2, making the second transport path GH2 conspicuous. Therefore, when the user tries to stop the blinking mode, the possibility in which the user opens the lower cover 81 is increased. Consequently, the document Gi jammed within the second transport path GH2 becomes less likely to be left therein and may be removed therefrom by priority.

When the document Gi within the second transport path GH2 is removed and the second light source L2 is turned off, if the document Gi still remains in the first transport path GH1, lighting control of the first light source L1 is performed. Specifically, similar to the case of the jams J1 to J3, on-off control of the first light source L1 is performed in accordance with the opening of the document transport device U1a. Thus, when the upper cover 71 is opened, the interior of the first transport path GH1 is illuminated, so that the document Gi in the first transport path GH1 may be removed with good viewability of the document Gi. Therefore, the remaining document Gi located astride the two transport paths may be removed in a state where the workability for the user is enhanced.

In the first exemplary embodiment, when the sensors SN2 to SN4 switch to a non-detecting state, it is detected that the removal of the document Gi located astride the two transport paths has been completed.

In the document transport device U1a according to the first exemplary embodiment, the first transport path GH1 has large curvature. Furthermore, the first transport path GH1 has the multiple rollers 43, 44, and 47 disposed therein, so that there are a large number of nips. Thus, when the document Gi is to be removed from the first transport path GH1, if the document Gi is pulled, the document Gi may possibly tear. Specifically, if the document Gi is pulled from the document feed tray U1a1 at the upstream side or through the opening 54 at the downstream side in a state where the upper cover 71 is closed, the document Gi may possibly tear. Therefore, if the document Gi becomes jammed in the first transport path GH1, it is desired that the document Gi be removed after uncovering the first transport path GH1 by moving the upper cover 71 to the open position. However, if the document Gi is to be removed by opening the upper cover 71, the document Gi to be removed tends to be pulled upward, that is, upstream of the transport path due to the configuration of the document transport device U1a.

Therefore, as shown in FIG. 23C, if there is a portion of the document Gi remaining in the second transport path GH2 at the downstream side, there is a possibility that the document Gi may become jammed or torn in the second transport path GH2, or the torn pieces may be left therein. Thus, in the first exemplary embodiment, if one of the jams J4 and J6 located astride the first transport path GH1 and the second transport path GH2 is detected, the document Gi in the second transport path GH2 is removed by priority in accordance with the configuration of the document transport device U1a. In general, dynamic light, like blinking light, tends to attract human attention more than static light, like glowing light. Therefore, in the first exemplary embodiment, the second light source L2 with higher priority is made to emit blinking light.

Furthermore, in the first exemplary embodiment, it is detected whether or not there is foreign matter at one or both of the read positions P1 and P2 immediately after the power of the copier U is turned on, when a predetermined number of documents are transported, or when a jam has been removed. If it is detected that there is foreign matter at one or both of the read positions P1 and P2, it is determined that one or both of the read positions P1 and P2 should be cleaned.

When it is determined that the read positions P1 and P2 should be cleaned, the display UIb displays any one of the images shown in FIGS. 10A to 10C in accordance with one or both of the read positions P1 and P2 that should be cleaned.

In this case, if the first-face read position P1 should be cleaned, the first light source L1 located at the left-end position Q11 is turned on, as shown in FIGS. 21A and 21C. Thus, of the document base PG, the read window PG1 corresponding to the first-face read position P1 is illuminated and becomes brighter. Consequently, the position of the read window PG1 that should be cleaned becomes readily recognizable. The control of the light emitters 12 and 13 of the first light source L1 between a partially on state and an off state during cleaning is similar to that when any one of the jams J1 to J4 and J6 is detected in that the control is performed in accordance with the opening and closing of the document transport device U1a. Thus, the brightness at the read window PG1 during cleaning may be readily reduced.

If the read surface 62 corresponding to the second-face read position P2 should be cleaned, the second light source L2 is turned on, as shown in FIGS. 22A and 22B. Thus, the read surface 62 and so on are illuminated so that the read surface 62 that should be cleaned becomes readily recognizable. The control of the light emitters 58 and 59 of the second light source L2 between a partially on state and an off state during cleaning is similar to that when one of the jams J5 and J7 is detected in that the control is performed in accordance with the opening and closing of the lower cover 81. Thus, the brightness at the read surface 62 during cleaning may be readily reduced.

When removing the document Gi, the user may sometimes touch the read window PG1 or the read surface 62. Thus, there is a possibility that, for example, user's fingerprint or sweat may remain on the read window PG1 or the read surface 62. Therefore, in the first exemplary embodiment, foreign-matter detection is performed even after the jams J1 to J7 have been removed.

Modifications

Although the exemplary embodiment of the present invention has been described in detail above, the present invention is not to be limited to the above exemplary embodiment and permits various modifications within the technical scope of the invention defined in the claims. Modifications H01 to H016 will be described below.

In a first modification H01, the image forming apparatus according to the above exemplary embodiment is not limited to the copier U, and may be, for example, a facsimile apparatus or a multifunction apparatus having multiple functions of such apparatuses. Furthermore, the above exemplary embodiment is not limited to an electrophotographic image forming apparatus and may be applied to an image forming apparatus of an arbitrary image forming type, such as a lithographic printer of an inkjet recording type or a thermal head type. Moreover, the above exemplary embodiment is not limited to a multicolor image forming apparatus and may be applied to a so-called monochrome image forming apparatus. The above exemplary embodiment is not limited to a so-called tandem-type image forming apparatus and may be applied to, for example, a rotary-type image forming apparatus.

The above exemplary embodiment is applied to the copier U having the scanner section U1 as an example of an image reading device. Alternatively, in a second modification H02, the above exemplary embodiment may be applied to the scanner section U1 alone.

The above exemplary embodiment is applied to the scanner section U1 that is capable of executing the automatic reading operation and the manual reading operation. Alternatively, in a third modification H03, the above exemplary embodiment may be applied to a configuration in which the manual reading operation is omitted. Specifically, for example, a configuration in which the units 18 and 24 are fixed is possible.

In the above exemplary embodiment, the document transport device U1a desirably uses the reading members CCD and 61 to read images of documents Gi at the two read positions P1 and P2. Alternatively, for example, in a fourth modification H04, the above exemplary embodiment may be applied to a configuration in which the read sensor 61 is omitted such that an image of a document Gi is read only at the read position P1.

In the above exemplary embodiment, when the light sources L1 and L2 are to be turned on when a jam occurs or when performing cleaning, a configuration in which white light sources are partially turned on or are turned on in a blinking mode is described as an example. Alternatively, for example, in a fifth modification (H05), white LEDs may be combined with RGB LEDs. In this case, the R element alone is turned on and the G and B elements are turned off when a jam occurs or when performing cleaning, such that the document transport path GH and the read positions P1 and P2 are illuminated with R-color light. Furthermore, a configuration that selectively uses different colors is also possible, such as using R-color light when a jam occurs and using G-color light when performing cleaning.

In the above exemplary embodiment, a configuration that uses white LEDs as light sources is described as an example. Alternatively, in a sixth modification (H06), light sources known in the related art, such as fluorescent lamps and organic electroluminescence (EL) light sources, may be used.

In the above exemplary embodiment, the light intensities of the light sources L1 and L2 are varied by changing the ratio of elements to be turned on. Alternatively, for example, in a seventh modification H07, a configuration in which the light intensities are varied while turning on all elements of the light sources L1 and L2 by performing on-off control of adjusting the ratio of on and off states in short cycles, namely, so-called pulse width modulation, is also possible.

In the above exemplary embodiment, when turning on only the right light emitter 13 of the two light emitters 12 and 13 of the first light source L1 or when turning on only the upstream light emitter 58 of the two light emitters 58 and 59 of the second light source L2, it is desired that the light emitters 13 and 58 to be partially turned on. Alternatively, for example, in an eighth modification H08, the light emitters 13 and 58 may be turned on in a manner similar to that when performing a reading operation. In this case, the other light emitters 12 and 59 in the light sources L1 and L2 are turned off. Thus, the light intensity of each of the light sources L1 and L2 is reduced, as compared with a case where both light emitters are turned on.

In the above exemplary embodiment, when the openable-closable members U1a and 81 are opened, the light emitters 12 and 59 that the user tends to face are desirably turned off so as to prevent the light from directly entering the user's eyes. Alternatively, for example, in a ninth modification H09, a configuration in which the light emitters 12 and 59 are not turned off is also possible, such as turning them on while reducing the light intensities thereof.

In the above exemplary embodiment, in a case where the light sources L1 and L2 are to be turned on when a jam occurs or when performing cleaning, even if the openable-closable members U1a and 81 are closed, it is desired that the light intensities of the light sources L1 and L2 be reduced by partially turning them on. Alternatively, for example, in a tenth modification H010, when the openable-closable members U1a and 81 are closed, light may be made readily leakable by simply turning on the light sources L1 and L2 in a manner similar to when performing a reading operation so as to make this state readily recognizable by the user. In this case, the light intensity of the first light source L1 is desirably reduced when the document transport device U1a or the upper cover 71 is opened. Moreover, the light intensity of the second light source L2 is desirably reduced when the lower cover 81 is opened.

In the above exemplary embodiment, when any one of the jams J1 to J3, J5, and J7 occurs or when foreign matter is detected, if only one of the light sources L1 and L2 is to be turned on, the light source is partially turned on. Alternatively, in an eleventh modification H011, the light source may be turned on in a blinking mode.

In the above exemplary embodiment, when one of the jams J4 and J6 occurs astride the transport paths GH1 and GH2, the second light source L2 for the second transport path GH2 from which the document should be removed by priority is turned on in a blinking mode, and the first light source L1 for the first transport path GH1 from which the document is to be removed afterwards is subsequently turned on. Alternatively, for example, in a twelfth modification H012, when one of the jams J4 and J6 occurs astride the transport paths GH1 and GH2, the second light source L2 may be turned on in a blinking mode, and the first light source L1 may be turned off. Then, when the document has been removed from the second transport path GH2, the second light source L2 may be turned off, and the first light source L1 may be partially turned on.

In the above exemplary embodiment, the timing for determining whether to perform the foreign-matter determining operation is set to when the power is turned on, when a predetermined number of documents have been transported, and when a jam has been removed. Alternatively, for example, in a thirteenth modification H013, the timing for determining whether to perform the foreign-matter determining operation may be set to, for example, when recovering from an energy-saving mode or when an input is directly received from the operable section UI.

The above exemplary embodiment is applied to an image reading device that is configured to read an image of a document Gi. Alternatively, for example, in a fourteenth modification H014, the above exemplary embodiment may be applied to an image reading device that is incorporated within an image forming apparatus. For example, the above exemplary embodiment may be applied to an image reading device in which a read position is set downstream of the fixing region Q5 in the transport direction of the recording sheet S. The image reading device may read an image recorded on the recording sheet S and check for defects in the recorded image.

In the above exemplary embodiment, a text image and a position-indicating image are displayed on the display UIb when a jam is detected or when foreign matter is detected. Alternatively, for example, in a fifteenth modification H015, the display UIb may be configured to display the text image alone. Furthermore, for example, a configuration in which a sound source is used as the notifying member in place of the display is also possible. In this case, in addition to the control of the light sources L1 and L2, detection of a jam or foreign matter may be notified with a buzzer sound.

In the copier U according to the above exemplary embodiment, the controller C executes a foreign-matter detection process. Alternatively, for example, in a sixteenth modification H016, the process may be distributed to multiple information processing apparatuses, such as including the function of the foreign-matter detector C16 in a remotely-installed information processing apparatus connected via a communication line. Then, foreign-matter detection image data read by the copier U may be transmitted to the remote information processing apparatus. At the remote information processing apparatus, the foreign-matter detection process may be performed based on the received image data. If foreign matter is detected, a signal may be transmitted to the copier U, which may then turn on the light sources L1 and L2 for the read positions P1 and P2. Accordingly, the foreign-matter detection process may be performed in a distributed manner. In this case, information indicating whether or not there is foreign matter at the read position P1 or P2 may be transmitted to a terminal of the responding operator, that is, an operator's terminal at a call center. Thus, when the user makes an inquiry to the operator, the operator may readily recognize the status of the copier U used by the user and may obtain a response according to a problem faced by the user. As an alternative to the foreign-matter detection process, an arbitrary process, such as the process for detecting the position of any one of the jams J1 to J7, may be performed by multiple information processing apparatuses in a distributed manner.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a transport path along which a medium having an image recorded thereon is transported;
   a light source member that radiates light onto the medium passing a predetermined read position in the transport path;
   a reading member that receives light from the read position and reads the image on the medium, the received light being the light from the light source member;
   a detecting member that is disposed in the transport path and that detects the medium; and
   a notifying member that notifies a user that the medium is jammed based on a detection result of the detecting member,
   wherein the light source member is turned on when the medium is jammed based on the detection result of the detecting member.

2. The image reading device according to claim 1,
   wherein a light intensity of the light source member when the medium is jammed and the transport path is not open is set to be higher than a light intensity of the light source member when the medium is jammed and the transport path is open.

3. The image reading device according to claim 1, further comprising:
   a device body that has the reading member;
   a read base that is supported by the device body and on which the medium to be read by the reading member is disposed; and
   a transport device that has the transport path formed therein and that is supported by the device body in an openable-closable manner about a rotation axis in a direction parallel to a transport direction of the medium,
   wherein the transport path has an opening that corresponds to the read position and that faces the read base when the transport device is closed,
   wherein the light source member is supported by the device body and has an upstream light emitter that radiates light from an upstream side of the read position in the transport direction of the medium and a downstream light emitter that radiates light from a downstream side of the read position in the transport direction of the medium, and
   wherein, in the light source member, a first one of the upstream light emitter and the downstream light emitter is turned on and a second one of the upstream light emitter and the downstream light emitter is turned off when the medium is jammed, the first one radiating light away from a center of the read base, the second one radiating light toward the center of the read base.

4. The image reading device according to claim 1, further comprising:
   a cleaning determiner that determines whether or not the read position is to be cleaned,
   wherein the notifying member provides a notification to the user so as to prompt the user to clean the read position when the read position is to be cleaned, and
   wherein the light source member is turned on when the read position is to be cleaned.

5. The image reading device according to claim 1,
   wherein when the medium is jammed, the light source member is turned on in accordance with a light intensity that is lower than a light intensity used when reading the image.

6. The image reading device according to claim 1,
   wherein the read position includes a first read position set in the transport path and a second read position set downstream of the first read position in a transport direction of the medium, and wherein the light source member includes a first light source member that is disposed in correspondence with the first read position and a second light source member that is disposed in correspondence with the second read position.

7. The image reading device according to claim 6, further comprising:
a jam determiner that determines whether or not the medium is jammed in a first predetermined range near the first read position and also determines whether or not the medium is jammed in a second predetermined range near the second read position,
wherein the first light source member is turned on when the medium is jammed in the first range, and
wherein the second light source member is turned on when the medium is jammed in the second range.

8. The image reading device according to claim 7,
wherein when the medium is jammed astride both the first range and the second range, a first one of the first light source member and the second light source member is turned on in a blinking mode and a second one of the first light source member and the second light source member is turned on in a glowing mode, the first one corresponding to a priority removal range and the second one corresponding to a subsequent removal range based on a predetermined removing order.

9. The image reading device according to claim 6, further comprising:
a transport device that has the transport path formed therein; and
an openable-closable member that is provided on at least one of an upstream side and a downstream side of the second read position in the transport direction of the medium and that supports the transport path in an openable-closable manner, wherein the second light source member has an upstream light emitter that radiates light from the upstream side of the second read position in the transport direction of the medium and a downstream light emitter that radiates light from the downstream side of the second read position in the transport direction of the medium, and wherein, in the second light source member, a first one of the upstream light emitter and the downstream light emitter is turned on and a second one of the upstream light emitter and the downstream light emitter is turned off when the medium is jammed, the first one radiating light away from the openable-closable member, the second one radiating light toward the openable-closable member.

10. An image forming apparatus comprising:
the image reading device according to claim 1; and
an image recording device that records an image onto a medium based on an image read by the image reading device.

11. An image reading device comprising:
a transport path along which a medium having an image recorded thereon is transported;
a light source member that radiates light onto the medium passing a predetermined read position in the transport path;
a reading member that receives light from the read position and reads the image on the medium, the received light being the light from the light source member;
a detecting member that is disposed in the transport path and that detects the medium;
a determiner that determines whether or not the medium is jammed in the transport path based on a detection result of the detecting member; and
a lighting unit that turns on the light source member when the medium is jammed in the transport path.

\* \* \* \* \*